(12) United States Patent
Minamide et al.

(10) Patent No.: US 7,203,931 B2
(45) Date of Patent: Apr. 10, 2007

(54) PROGRAMMABLE CONTROLLER, AND CONTROL-PROGRAM-DEVELOPMENT SUPPORTING APPARATUS

(75) Inventors: Hideaki Minamide, Tokyo (JP); Teruaki Tanaka, Tokyo (JP); Yoshiko Shiomoto, Tokyo (JP); Shigeki Nankaku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 563 days.

(21) Appl. No.: 09/777,954

(22) Filed: Feb. 7, 2001

(65) Prior Publication Data
US 2002/0059567 A1    May 16, 2002

(30) Foreign Application Priority Data
Sep. 22, 2000 (JP) .............................. 2000-289373

(51) Int. Cl.
*G06F 9/45* (2006.01)
*G05B 11/01* (2006.01)

(52) U.S. Cl. .................................... 717/136; 700/18

(58) Field of Classification Search ................ 717/124, 717/136, 140–143, 151–153, 168, 172; 712/32, 712/206, 207; 711/140; 326/37, 46; 700/11, 700/18
See application file for complete search history.

(56) References Cited

U.S. PATENT DOCUMENTS

| | | | | |
|---|---|---|---|---|
| 4,716,541 A | * | 12/1987 | Quatse | 712/223 |
| 4,722,071 A | * | 1/1988 | Gates et al. | 717/141 |
| 5,285,376 A | * | 2/1994 | Struger et al. | 700/18 |
| 5,453,933 A | | 9/1995 | Wright et al. | |
| 5,498,954 A | * | 3/1996 | Bassett et al. | 323/340 |
| 5,504,902 A | * | 4/1996 | McGrath et al. | 717/146 |
| 5,508,909 A | * | 4/1996 | Maxwell et al. | 700/18 |
| 5,517,639 A | * | 5/1996 | Yamaguchi | 700/108 |
| 5,594,917 A | * | 1/1997 | Palermo et al. | 712/34 |
| 5,857,093 A | * | 1/1999 | Bradford | 703/21 |
| 5,950,005 A | * | 9/1999 | Elbers et al. | 717/141 |
| 6,006,032 A | * | 12/1999 | Blandy et al. | 717/127 |
| 6,263,487 B1 | | 7/2001 | Stripf et al. | |
| 6,345,384 B1 | * | 2/2002 | Sato | 717/160 |

FOREIGN PATENT DOCUMENTS

| | | |
|---|---|---|
| EP | 875-023 | 1/1997 |
| JP | 59-212907 | 12/1984 |
| JP | 7-295612 | 11/1995 |
| JP | 08-137521 | 5/1996 |

(Continued)

OTHER PUBLICATIONS

Alfred V. Aho, et al., "Compilers: Principles, Techniques, and Tools," 1988, Addison-Wesley Publishing Company, pp. i, ii, 554-557, 592-598.*

(Continued)

*Primary Examiner*—Tuan Dam
*Assistant Examiner*—Eric B. Kiss
(74) *Attorney, Agent, or Firm*—Leydig, Voit & Mayer, Ltd.

(57) ABSTRACT

A programmable controller includes a universal microprocessor. This universal microprocessor incorporates an acceleration section. The control-program-development supporting apparatus generates an execution code directly executable by the universal microprocessor. Thereby, the acceleration section executes sequential processing.

13 Claims, 24 Drawing Sheets

FOREIGN PATENT DOCUMENTS

| | | |
|---|---|---|
| JP | 08-249177 | 9/1996 |
| JP | 10-207708 | 8/1998 |

OTHER PUBLICATIONS

"ApplicationBuilder Software for SLC Processors: User Manual," 1997, Allen-Bradley Company, Inc., Cat. No. 6556-SAB, 70 pages.*

Brenda S. Baker, et al., "Compressing Differences of Executable Code," 1999, ACM SIGPLAN Workshop on Compiler Support for System Software (WCSSS'99), pp. 1-10.*

Hyung Seok Kim, et al., "A Translation Method of Ladder Diagram on PLC with Application to a Manufacturing Process," 1999, IEEE Conference on Robotics and Automation '99, pp. 1-6.*

Jonathan B. Rosenberg, "How Debuggers Work: Algorithms, Data Structures, and Architecture," 1996, John Wiley $ Sons, Inc., pp. i, ii, xi-xv, 1-37, 151-172.*

"TMS320C40 Digital Signal Processor," 1996, Texas Instruments, Inc., SPRS038, pp. 1-42.*

Thomas Chester and Richard H. Alden, "Mastering Excel 97," 4th ed., 1997, SYBEX, Inc., Alameda, CA, pp. iii, iv, 85-118.*

"TMS320C4x User's Guide," May 1999, Texas Instruments, pp. i-xvi, Chapter 2 (24 pages), Chapter 4 (14 pages), and Chapter 8 (23 pages).*

"Ladder WORK, The first Ladder/Replay Logic compiler for microcontrollers", http://www.microshadow.com/english/ladrwork.htm (1999).

"Great Microprocessors of the Past and Present", http://www.microprocessor.sscc.ru/great/s3.html (Aug. 30, 2006).

Mortazavi, B.; "Performance of MAP in the remote operation of a CNC", *IEEE Transactions on Software Engineering*, vol. 16, No. 2, pp. 231-237, (Feb. 1990).

Webb, M.; "Sophisticated Motion Control Systems with a High-Level Computer Language", *Intl. Conf. on Control*, pp. 382-386, (Mar. 25-28, 1991).

Kleines, H., et al.; "Real Time Unix in Embedded Control—A Case Study within the context of LynxOS", *IEEE Transactions on Nuclear Science*, vol. 43, No. 1, pp. 13-19, (Feb. 1996).

Vincent, J., et al.; "The NSCL Control System", *IEEE Transactions on Nuclear Science*, vol. 43, No. 1, pp. 30-38, (Feb. 1996).

Blanco, C., et al.; "An Intrinsic Safety PLC With A Graphic Programming Environment", *Proceeding of the 24th Annual Conf. of the IEEE Industrial Elec. Soc.*, vol. 3, pp. 1649-1652, (Aug, 31-Sep. 4, 1998).

Le Parc, P., et al.; "Grafcet Revisited with a Synchronous Data-Flow Language", *IEEE Transactions on Systems, Man and Cybernetics-Part A*, vol. 29, No. 3, pp. 284-293, (May 1999).

Wolf, W., et al.; "Embedded Systems Education for the Future", *Proceddings of the IEEE*, vol. 88, No. 1, pp. 23-30, (Jan. 2000).

Wind River Systems: VxWorks Programmer's Guide 5.4, Ch. 8. 4, (May 1999).

Ham, J.; "OACG: A Framework for Developing Open Control", *IEEE Colloguium on Open Control in the Process and Manufacturing Ind.*, pp. 6/1-6/4, (May 15, 1998).

Pina, B., et al.; "Including object-Oriented Properties In the PLC's Programming Languages", *7th IEEE Intl. Conf. on Emerging Tech. and Factory Automation*, vol. 2, pp. 1029-1034, (Oct. 1999).

Perrier, V.; "Adapting Java for embedded development", *IEE Review*, vol. 46, No. 3, pp. 29-35, (May 2000).

* cited by examiner

| NUMBER OF STEPS | FILE NAME AFTER DIVISION |
|---|---|
| 0~99 | Control1.il |
| 100~199 | Control2.il |
| ⋮ | ⋮ |

FIG.7

| JUMP-DESTINATION LABEL NAME | FILE NAME AFTER DIVISION |
|---|---|
| P 1 | Control1.il |
| P 2 | Control2.il |
| ⋮ | ⋮ |

FIG.16

| INSTRUCTION | SIZE (NUMBER OF STEPS) | PROCESSING TIME (msec) |
|---|---|---|
| LD,OUT | 1K | XX |
| LD,AND,OUT | 1K | YY |
| ⋮ | ⋮ | ⋮ |
| LDI,AND,OUT | 10K | ZZ |
| ⋮ | ⋮ | ⋮ |

FIG.24

SOURCE FILE

```
LD      X0
OR      X2
LD      X1
OR      X3
ANB
LD      X4
AND     X5
ORB
OUT     M0
LD      X1C
MPS
AND     M8
OUT     Y30
MPP
OUT     Y31
LD      X1D
MPS
AND     M9
MPS
AND     M68
OUT     Y32
MPP
AND     T0
OUT     Y33
MPP
OUT     Y34
```

FIG.25

C-LANGUAGE EXPRESSION OF COMPRESSED FILE

```
signed char* _InputSourceName="sample.il.gz";

unsigned char _InputSource[]={
0x1f,0x8b,0x08,0x08,0x9b,0xd9,0x84,0x39,0x00,0x03,0x73,0x61,0x6d,0x70,0x6c,0x65,
0x2e,0x69,0x6c,0x00,0xf3,0x71,0xe1,0x8c,0x30,0xe0,0xe5,0xf2,0x0f,0xe2,0x8c,0x30,
0xe2,0xe5,0xf2,0x01,0xf2,0x0c,0x21,0x3c,0x63,0x5e,0x2e,0x47,0x8f,0x27,0x88,0x90,
0x09,0x88,0x0d,0xa4,0x0d,0x41,0x52,0x40,0x31,0xff,0xd0,0x10,0x4e,0x5f,0x03,0xa8,
0x72,0x67,0x5e,0x2e,0xdf,0x80,0x60,0x88,0x0a,0x5f,0x0b,0x88,0x64,0xa4,0xb1,0x01,
0x48,0x34,0x00,0xc6,0x33,0x84,0xaa,0x75,0x41,0x56,0x6b,0x89,0xcc,0x31,0x83,0xeb,
0x34,0x82,0xea,0x04,0x09,0x87,0x18,0xc0,0x44,0x8d,0x51,0xcc,0x03,0x3a,0x08,0x00,
0x10,0xeb,0x7d,0x3a,0xb9,0x00,0x00,0x00};
```

PROGRAMMABLE CONTROLLER, AND
CONTROL-PROGRAM-DEVELOPMENT
SUPPORTING APPARATUS

FIELD OF THE INVENTION

The present invention relates to a programmable controller that performs sequential processing in accordance with execution codes generated by compiling a control program such as an instruction list or ladder diagram and a control-program-development supporting apparatus for compiling and debugging the control program.

BACKGROUND OF THE INVENTION

Production equipment and production methods have rapidly changed in industrial fields, particularly in production fields, independent of the scale of a field, and the range of electrical-system controllers for equipment and systems for production has been increasing year after year. Therefore, it is important in communicating with a mechanical system, rationally to improve the cost performance, and realize a high-speed easy-to-handle user interface in this environment.

Conventionally, programmable controllers (PC) and development environment for controlling the controllers have been developed that realize the above-mentioned conditions. A programmable controller is also referred to as a programmable logic controller (PLC) or sequencer. The programmable controller generally operates in accordance with the description of a special control program for sequential processing.

The sequential processing has a basic processing flow of receiving a signal from an input device such as a sensor or switch and transmitting a control signal to an output device such as an indicator or electromagnetic relay in accordance with a state of the received signal or a specific order. That is, a control program is a program in which the flow of the above sequential processing is described.

In general, the control program is developed by a universal computer such as a personal computer or program loader (hereafter referred to as control-program-development supporting apparatus) and transferred to a programmable controller through a communication interface.

The ladder diagram system, function-block diagram system, structured text system, and SFC (Sequential Function Chart) system are typically known among languages for describing a control program. Particularly, the ladder diagram system is a system in which a circuit diagram is drawn like a ladder, two vertical lines at the both ends of the ladder symbolically show motive power, and the flow of the motive power of a relay contact circuit is shown on a line horizontally connected between the two lines, which is a language most widely used.

The ladder diagram system first expresses the flow of sequential processing in accordance with the arrangement of graphic symbols which can be intuitively understood by a person as described above and then converts the arrangement of the graphic symbols into an instruction list shown by mnemonic codes which can be interpreted by a programmable controller by a converter such as a control-program-development supporting apparatus.

Therefore, the programmable controller may use a configuration for receiving the instruction list and executing sequential processing in accordance with instructions shown by the instruction list. In this case, the programmable controller sequentially executes a control program by interpreting the received instruction list line by line, that is, by converting the list into code directly executable by a microprocessor mounted on the programmable controller. The programmable controller is hereafter referred to as interpreter-type programmable controller.

Moreover, a compiling-type programmable controller is practically used as another type of programmable controller that receives directly-executable code from a control-program-development supporting apparatus through a microprocessor in the programmable controller and executes the codes. In the case of the configuration using the compiling-type programmable controller, a control-program-development supporting apparatus is provided with a compiler, which converts a ladder diagram directly or temporarily into an instruction list by the compiler and then compiles the list into code directly executable by the microprocessor and transfers the execution codes to the programmable controller.

However, because the above control program depends on the vendor or type of programmable controller, it is impossible to execute the same sequential processing between different types of programmable controllers by using control programs having the same source code. Therefore, it is necessary to develop a new control program or transplant a new model or different model to a programmable controller and thus, it is difficult to effectively use past properties of a control program.

Therefore, a method is proposed which obtains execution codes by describing a control program with not a conventional sequential-processing language such as a ladder diagram or instruction list but an advanced programming language used for a personal computer and compiling the advanced programming language with a compiler.

For example, according to the advanced-language sequence instruction program generator and universal sequencer disclosed in Japanese Patent Laid-Open No. HEI 7-295612, the advanced-language sequence instruction program generator translates a language sequence instruction program into an advanced-language sequence instruction program with a translation program and compiles the advanced-language sequence instruction program to generate an execution-type sequence instruction program. Or, the universal sequencer executes the advanced-language sequence instruction program while sequentially interpreting the program. Thereby, it is possible to execute sequential control with the same control program independently of the vendor or type of a sequencer.

Moreover, the following two methods are known in order to update the contents of a control program stored in a program controller. One of them is a method in which a control-program-development supporting apparatus transfers a control program to a programmable controller currently stopped and the programmable controller starts execution processing after reception of the control program is completed.

The other of them is a method (hereinafter, referred to as under-RUN writing method) in which a programmable controller rewrites the contents of a control program currently executed to contents of a new control program while continuing the execution state. A programmable controller normally operates by repeatedly interleaving and executing a loop of a binary-code string corresponding to each instruction to be executed one-to-one. This method is realized by first reading a new control program into an idle memory space and when reading of the program is completed, stopping the execution of an original control program and starting the execution of the new control program at the start or end timing of the loop.

Moreover, a so-called software programmable controller is practically used in which development and debugging of a control program realized by the above control-program-development supporting apparatus and sequential processing of a programmable controller are realized by one system. The configuration of the software programmable controller is the same as that of a universal computer, in which sequential processing to external input and output devices is realized by software.

However, the above-described programmable controller and control-program-development supporting apparatus have the following problems.

Firstly, there is a problem that, because a microprocessor in a universal computer (hereafter referred to as universal Microprocessor), such as a personal computer, operates with an advanced function at a high speed and has become inexpensively available in recent years, the advantage of developing a microprocessor in a conventional programmable controller with an ASIC (Application Specific IC) is slowly decreasing.

Particularly, a universal microprocessor is provided with primary and secondary caches and constructed in accordance with acceleration of processing techniques such as pipeline processing, super-scaler processing and out-of-order processing and moreover, execution codes directly executable by the universal microprocessor are also generated by a compiler for converting the execution codes into execution codes forming an optimum code system by fully using the acceleration techniques.

Because most compilers of the above universal computer compile a program described with an advanced programming language easily understandable by a user, it is very advantageous to mount a universal processor on a programmable control together with the above compilers and make the processor execute sequential processing. In the case of a universal computer, however, the start point of program development is set to description of an advanced programming language. Therefore, a problem occurs that it is impossible to make efficient use of a control program such as a ladder diagram or instruction list, that is, the past property of sequential processing.

Secondly, because a control program tends to be lengthened due to diversification of input and output devices and complication of sequential processing, there is a problem that a lot of time is necessary for development, compiling, interpreting, and debugging of the control program.

Thirdly, because a compiling-type programmable controller receives an execution code and directly starts sequential processing, there is a problem that it is difficult to estimate an actual processing time corresponding to each instruction unit or processing-block unit of an original control program.

Fourthly, though the "advanced-language sequence instruction program generator" disclosed in the above Japanese Patent Laid-Open No. HEI 7-295612 generates an object file by converting a source file described with the control program of an instruction list or the like into the source file of an advanced programming language such as C language, if only the source file of the advanced programming language is corrected. There is a problem that two source files showing the same sequential processing do not match each other because the source file of an original control program is not changed due to the above correction.

Particularly, in the case of a control-program-development supporting apparatus capable of developing a control program with an advanced programming language, to perform step execution by using a debugging tool, for example, step execution is possible for one line of the advanced programming language but it is impossible to perform step execution every line for a language configuration such as an instruction list before conversion into an advanced programming language.

Moreover, in general, at a job site where a programmable controller works, a control-program-development supporting apparatus capable of directly operating an advanced programming language is not set in many cases. Therefore, when a trouble occurs in sequential processing or a control program must be slightly corrected, debugging may be performed by using a simple control-program-development supporting apparatus capable of using only a sequential-processing language such as an instruction list. That is, in this case, the above problem becomes remarkable. To correspond to the above problem, it is necessary to prepare a control-program-development supporting apparatus capable of directly operating an advanced programming language in every job site but the cost for setting the system increases.

Fifthly, to realize the above-described under-RUN writing method, there is a problem that a memory having the same size as a memory in which a control program currently executed is read must be separately prepared. Because a memory is generally expensive among hardware parts, a maker or user must make a large investment in order to realize the under-RUN writing method.

Sixthly, the above-described compiling-type control-program-development supporting apparatus has a problem that it is generally impossible to restore a control program such as an original instruction list from finally generated execution codes. Therefore, when a programmable controller and a control-program-development supporting apparatus are set in housings separate from each other and they are separated from each other off-line, an original control program and an execution code actually executed are stored in places different from each other.

Particularly, in the case of a compiling-type control-program-development supporting apparatus, if the source file of a control program disappears at the control-program-development supporting apparatus side, it is impossible to restore the control program such as an instruction list and debugging becomes impossible. In this case, a control program must be rewritten from the beginning.

Moreover, even if the source file of a control program does not disappear, it is necessary to access a control-program-development supporting apparatus storing the source file of an original control program and fetch the file in order to change the processing contents of a programmable controller currently operated at a job site.

Seventhly, the above programmable controller or control-program-development supporting apparatus, independently of the interpreter type or compiling type, has a problem that the procedure for interpreting processing contents is not always efficient though a part for sequentially interpreting processing contents of a control program described by a user is present. The part for performing sequential interpretation (hereafter referred to as instruction interpreting unit) serves as a part for reading each data value constituting a control program when the program is executed and interpreting the execution of an instruction designated by the data value in the case of an interpreter-type programmable controller and serves as a part for sequentially reading and interpreting a control program and converting it into a proper output format in the case of a compiling-type control-program-development supporting apparatus.

An instruction interpreting unit is generally described with a structure of comparing input data with a pattern of the interpretation side and when the data and the pattern match each other, executing a previously-stored operation (action). Therefore, pattern matching of the instruction interpreting unit requires a lot of time when the operation is executed in the case of the interpreter type and when the operation is compiled in the case of the compiling type. Thus, both types have factors impeding productivity.

SUMMARY OF THE INVENTION

It is the first object of the present invention to provide a programmable controller which mounts a universal microprocessor having advantages that higher-speed sequential processing can be realized and the microprocessor can be inexpensively obtained and a control-program-development supporting apparatus for generating an execution code directly executable by a universal microprocessor from a control program such as an instruction list.

It is the second object of the present invention to provide a control-program-development supporting apparatus or programmable controller capable of minimizing a part for performing recompiling by dividing a control program such as an instruction list at a predetermined position and generating a file every divided block.

It is the third object of the present invention to provide a control-program-development supporting apparatus or programmable controller capable of estimating the execution of a control program by preparing a sample program whose processing time is already known.

It is the fourth object of the present invention to provide a control-program-development supporting apparatus or programmable controller capable of debugging the source file of an advanced programming language intermediately generated and the source file of an actual control program while matching the both source files.

It is the fifth object of the present invention to provide a programmable controller for automatically replacing an execution code currently executed with a new execution code in accordance with the difference data in which only modified portions of a control program are described.

It is the sixth object of the present invention to provide a control-program-development supporting apparatus capable of unifying a control program and an execution code by compressing the source file of the control program and inserting the source file into the execution code and a programmable controller.

It is the seventh object of the present invention to provide a control-program-development supporting apparatus capable of shortening the time necessary for sequential instruction interpretation such as compiling or interpreting by preferentially pattern-matching instructions frequently used in a control program with an instruction interpreting section and a programmable controller.

The programmable controller according to one aspect of the present invention comprises a storing unit which stores the execution code and a universal microprocessor which mounts an acceleration mounting unit such as a pipeline logic or cache and which is directly executed by the execution code.

According to the above invention, because a universal microprocessor which mounts acceleration mounting unit is used and a received execution code is optimized so that the code is executed by the acceleration mounting unit of the universal microprocessor, it is possible to execute a sequential operation through high-speed processing such as pipeline super-scaler, or out-of-order.

The control-program-development supporting apparatus according to one aspect of the present invention comprises a compiler which compiles the control program into execution codes directly executable by a universal microprocessor which mounts acceleration mounting unit such as a pipeline logic or cache.

According to the above invention, a control program described with a sequential-control language is compiled into execution codes executable by a universal microprocessor that mounts acceleration mounting unit. Therefore, it is possible to execute a sequential operation through high-speed processing such as pipeline, super-scaler, or out-of-order by transmitting the execution codes to a programmable controller provided with the universal microprocessor and moreover, obtain execution codes corresponding to various universal microprocessors.

The control-program-development supporting apparatus according to another aspect of the present invention comprises a control-program dividing unit which divides the control program into a plurality of blocks, a compiler which compiles all or some of the blocks into execution codes directly executable by a programmable controller, and a communication interface which transmits the execution codes to the programmable controller.

According to the above invention, because it is possible to obtain final execution codes by dividing a control program into a plurality of blocks and compiling the control program every divided blocks, it is possible to generate execution codes by recompiling only portions to be modified in the control program even if the control program is a long program.

The control-program-development supporting apparatus according to still another aspect of the present invention comprises a control-program dividing unit which divides the control program into a plurality of blocks, a control-program converting unit which converts all or some of the blocks into an advanced-language control program described with a universal-computer-readable advance language every blocks concerned, and a compiler which compiles the whole of a part of a corresponding advanced language into execution codes directly executable by a programmable controller every blocks concerned.

According to the above invention, a control program is divided into a plurality of blocks and each of the divided blocks is converted into a universal-computer-readable advanced language. Moreover, it is possible to compile a program described with a universal-computer-readable advanced language corresponding to each block and obtain final execution codes. Therefore, even if a long control program is used, it is possible to generate execution codes by recompiling only a portion to be modified in the program and use a compiler for a conventional universal-computer-readable advanced language.

Further, it is preferable that the programmable controller is provided with a universal microprocessor that mounts acceleration mounting unit such as a pipeline logic and a cache. Accordingly, it becomes possible to execute a sequential operation through high-speed processing such as pipeline, super-scaler, or out-of-order.

Further, it is preferable that the control program is a ladder diagram or an instruction list generated from the ladder diagram, and the control-program dividing unit divides the control program into a plurality of blocks at a predetermined rung in the ladder diagram to generate a program file every block concerned. Accordingly, it becomes possible to manage program files every a series of circuit blocks from input up to output and lower the frequency of a trouble that optimum assignment of register variables having input/output device values under compiling is impeded due to division. Particularly, it is possible to improve the register utilization efficiency by a compiler and efficiently use an optimizing function of minimum operation assignment by constituting a block of a collection of a plurality of rungs.

Further, it is preferable that the control program is a ladder diagram or an instruction list generated from the ladder diagram, and the control-program dividing unit divides the control program into a plurality of blocks at a predetermined rung serving as a jump destination for a jump instruction in the ladder diagram to generate a program file every block concerned. Accordingly, optimization of a compiler is not influenced and it is possible to manage a divided program file as a subroutine.

Further, it is preferable that the control program is a ladder diagram or an instruction list generated from the ladder diagram, the control-program dividing unit extracts all or some of rungs including instructions for a common input or output device from the ladder diagram, one block is constituted of all or some of the extracted rungs, and a program file is generated every block concerned. Accordingly, when it is necessary to modify a control program for a specific device, it is possible to obtain an execution code by changing and recompiling only a program file corresponding to the portion to be modified.

Further, it is preferable that an optimization filtering unit is included which reconstructs the control program into an optimum code system by rearranging codes for excluding variables not cited and redundant codes and locally arranging instructions for a common input or output device and a control program optimized by the optimization filtering unit is newly used as the former control program. Accordingly, it becomes possible to provide a control program constituted of optimized codes for the compiler.

Further, it is preferable that a relating table is included which relates a sample program whose processing time is already known with a control program corresponding to the execution code, wherein processing time roughly-estimating means for estimating the sequential-processing execution time of a programmable controller is included. Accordingly, it becomes possible to know the processing time of each instruction in a control program, which has been difficult so far.

The control-program-development supporting apparatus according to still another aspect of the present invention comprises a control-program converting unit which converts the control program into an advanced control program described with a universal-computer-readable advanced language, a debugging-code generating unit which generates a debugging control program by inserting a line number concerned into a portion corresponding to each line constituting the instruction list in a source code constituting the advanced-language control program, and a debugging executing unit which relates each line of the instruction list with the execution part of the advanced-language control program and displaying them by step-executing the debugging control program.

According to the above invention, it is possible to step-execute an instruction list and the execution part of an advanced-language control program obtained by converting the instruction list display by relating the instruction list with the execution part and display the execution part. Therefore, also in the case of a programmable controller to be operated in accordance with an execution code obtained by compiling an instruction list, it is possible to confirm operations at the step-execution level of an instruction list described by a user.

The control-program-development supporting apparatus according to still another aspect of the present invention comprises a first storing unit which stores the execution code, a second storing unit which stores the data for the difference between the execution code which is stored in the first storing unit and a new execution code, a microprocessor to be directly executed in accordance with the execution code, and a patch processing unit which changes an execution code currently executed to a new execution code and continuously executing the changed execution code at a predetermined timing.

According to the above invention, in accordance with the data for the difference between the execution code which is continuously executed and the new execution code, an execution code currently executed is changed to a new execution code at a predetermined timing and the changed execution code is continuously executed. Therefore, even if it is necessary to change execution codes, it is possible to correct only a changed binary code among execution codes and change it to a new execution code and continue a new sequential operation without interrupting the execution state of a programmable controller.

The control-program-development supporting apparatus according to still another aspect of the present invention comprises a storing unit which stores the execution code and a microprocessor to be directly executed by the execution code. The execution code includes binary data generated by compressing the control program.

According to the above invention, a control program necessary for development or debugging and execution codes are unified and stored in a programmable controller. Therefore, when loosing the control program or directly operating the control program from a job-site programmable controller, it is possible to fetch the control program from the execution codes.

The control-program-development supporting apparatus according to still another aspect of the present invention comprises a compressing unit which compresses the control program to generate a compressed file, a code converting unit which generates compressed data obtained by converting the compressed file into the code system of the control program, and a compiler for combining the control program with the compressed data and compiling the program and the data into codes directly executable by a programmable controller.

According to the above invention, a control program necessary for development or debugging and execution codes to be actually executed are unified to generate a new execution code. Therefore, when loosing the control program or directly operating the control program from a job-site programmable controller, it is possible to fetch the control program from the execution codes.

The programmable controller according to still another aspect of the present invention comprises a storing unit which stores the control program, an instruction counting unit which counts the appearance frequency of each instruction used for the control program, a pattern-matching-table generating unit which generates a pattern matching table in which instructions are listed starting with an instruction having the highest appearance frequency in accordance with results counted by the instruction counting unit, and an interpreting unit which executes the control program while pattern-matching the control program in order of the instructions listed in the pattern matching table and interpreting the control program into execution codes directly executable by the programmable controller.

According to the above invention, instructions in a control program are pattern-matched starting with an instruction having the highest appearance frequency when interpreting the control program into execution codes. Therefore, it is possible to quickly find an execution code suitable for each instruction of the control program when interpreting the control program.

The control-program-development supporting apparatus according to still another aspect of the present invention comprises an instruction counting unit which counts the appearance frequency of each instruction used for the control program, a pattern-matching-table generating unit which generates a pattern matching table in which instructions are listed starting with an instruction having the highest appearance frequency in accordance with results counted by the instruction counting unit, and a compiler which compiles the control program into codes directly executable by the programmable controller while pattern-matching the control program in order of instructions listed in the pattern-matching table.

According to the above invention, because instructions are pattern-matched starting with an instruction having the highest appearance frequency in a control program when compiling the control program into execution codes, it is possible to quickly find an execution code suitable for each instruction of the control program when compiling the control program.

The control-program-development supporting apparatus according to still another aspect of the present invention comprises any of the above-mentioned control-program-development supporting apparatus according to the present invention.

According to the above invention, it is possible to realize functions of the above control-program-development supporting apparatus and those of the above programmable controller with a software programmable controller making it possible to develop a control program and also execute sequential processing.

Other objects and features of this invention will become apparent from the following description with reference to the accompanying drawings.

BRIEF DESCRIPTION OF THE DRAWINGS

FIG. 7 is a table showing the relation between a jump-destination label name and a divided file in the control-program-development supporting apparatus of the second embodiment;

FIG. 16 is a table showing sample programs and their sizes, and processing times in a control-program-development supporting apparatus of a fifth embodiment;

FIG. 24 is an illustration showing a source file that is the content of a control program in the control-program-development supporting apparatus of the eighth embodiment;

FIG. 25 is an illustration showing a C-language expression obtained by converting a compressed file in the control-program-development supporting apparatus of the eighth embodiment;

DESCRIPTION OF THE PREFERRED EMBODIMENTS

Preferred embodiments of a programmable controller and a control-program-development supporting apparatus of the present invention are described below in detail by referring to the accompanying drawings. However, the present invention is not restricted to the embodiments.

First, the programmable controller and control-program-development supporting apparatus of first embodiment are described. The programmable controller of the first embodiment mounts a universal microprocessor constructed in accordance with the acceleration mounting art. The control-program-development supporting apparatus of the first embodiment compiles a control program described with a sequential-processing language such as an instruction list and generates execution codes directly executable by the universal microprocessor.

Figure 1:
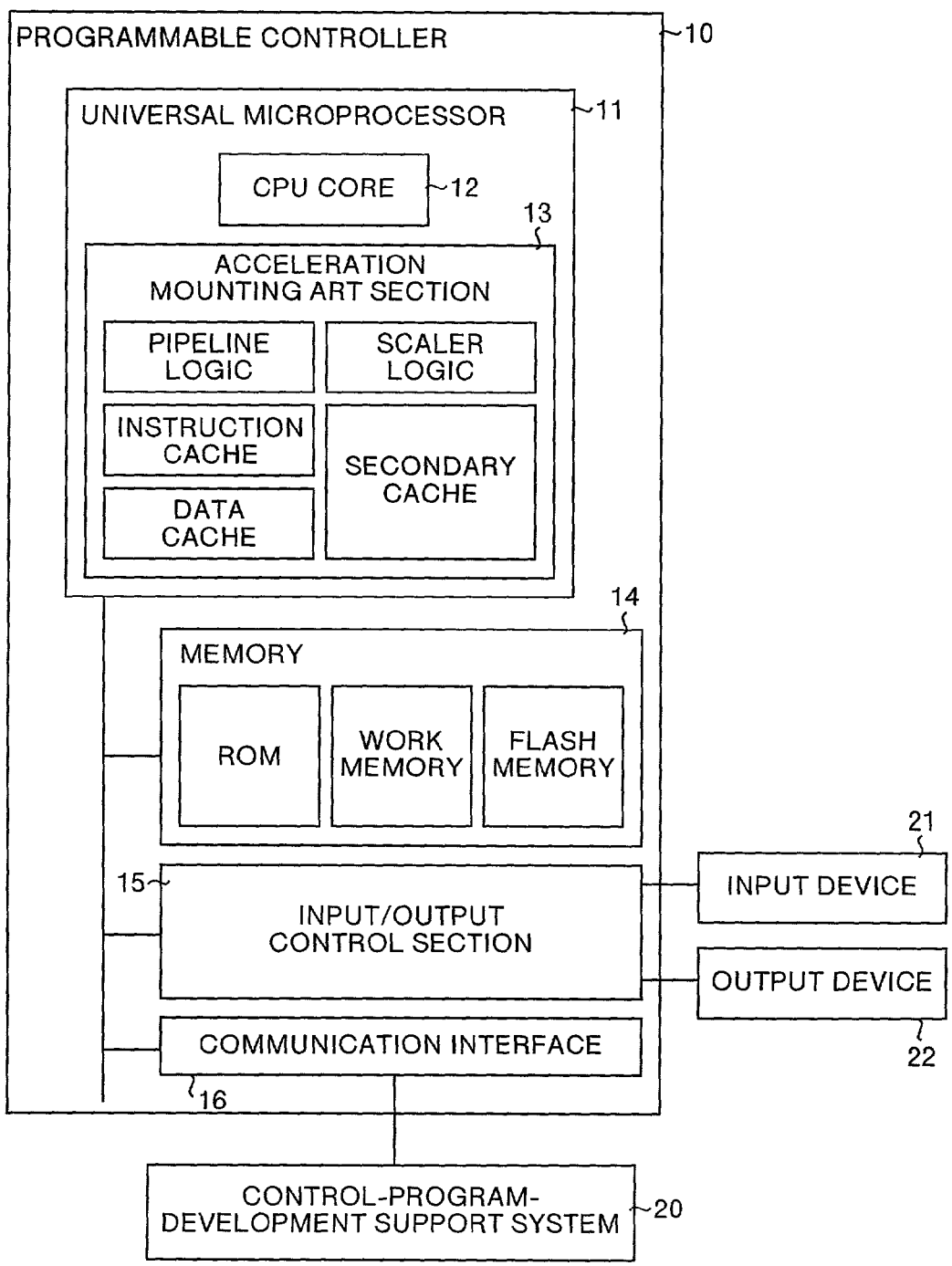
FIG. 1 is a block diagram showing a schematic configuration of a programmable controller of a first embodiment.

FIG. 1 is a block diagram showing a schematic configuration of the programmable controller of the first embodiment. The programmable controller 10 comprises a universal microprocessor 11 for executing sequential processing in accordance with execution codes, a memory 14 for storing execution codes and the like, a communication interface 16 for receiving a binary file and the like serving as execution codes from a control-program-development supporting apparatus 20 and transmitting a program and the like in the memory 14 to an external unit according to necessity, depend on the indication of the universal microprocessor 11, and an input/output control section 15 for inputting a signal from an external input device 21 and outputting a control signal to an external output device.

Particularly, as shown in FIG. 1, the universal microprocessor 11 is provided with a CPU core 12 for performing basic arithmetic processing of the stored-program type or the like, and an acceleration mounting art section 13. And the acceleration mounting art section 13 includes an instruction cache and that is constructed. The acceleration mounting art section 13 includes a data cache, a secondary cache, a pipeline logic, and a scaler logic. That is, the universal microprocessor 11 is a microprocessor capable of performing not only pipeline processing and super-scaler processing but also acceleration processing such as out-of-order, branch estimation, and speculative execution. In the case of the universal microprocessor 11 shown in FIG. 1, the acceleration mounting art section 13 is separated from the CPU core 12. However, a configuration is also present which has a plurality of functional blocks of the acceleration mounting art section 13 in the CPU core 12.

Moreover, the memory 14 is used for arithmetic processing by the universal microprocessor 11 and constituted of a work memory for loading actual execution parts or the whole of execution codes, a ROM in which a BIOS (Basic Input Output System) is recorded, and a nonvolatile memory such as a flash memory for storing every execution code. Though not illustrated, the programmable controller 10 can be provided with a secondary storing unit such as a magnetic disk drive or memory card for storing execution codes, programs, or data.

That is, the configuration of a conventional programmable controller can be applied to the programmable controller 10 shown in FIG. 1 except that a microprocessor constituted of a conventional ASIC is replaced with a universal microprocessor provided with acceleration mounting means.

Thus, to make the programmable controller 10 execute sequential processing, execution codes directly executable by the universal microprocessor 11 are necessary, which are generated by the control-program-development supporting apparatus 20.

The control-program-development supporting apparatus 20 can be realized by the same configuration as a universal computer system such as a personal computer as long as the control-program-development supporting apparatus 20 is provided with an interface communicable with the programmable controller 10.

Figure 2:
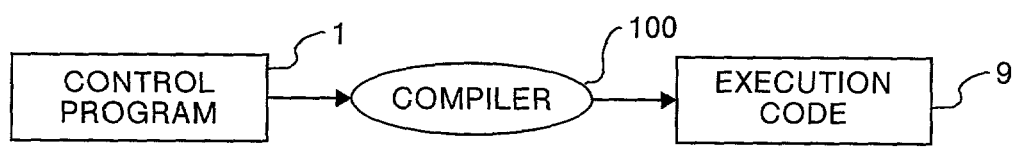
FIG. 2 is an illustration for explaining the generation of an execution code in a control-program-development supporting apparatus of the first embodiment.

Particularly, the control-program-development supporting apparatus 20 is provided with a compiler for reading the file of a control program described with a ladder diagram or instruction list and compiling the code system of the read file into execution codes directly executable by the universal microprocessor 11. FIG. 2 is an illustration for explaining the generation of an execution code by the control-program-development supporting apparatus of the first embodiment.

As shown in FIG. 2, the control-program-development supporting apparatus 20 generates an execution code 9 by inputting a control program 1 described with a sequential-processing language such as a ladder diagram or instruction list already developed or newly developed to a compiler 100. Though the compiler 100 can be realized by a software program or hardware logic, it is necessary to generate an execution code for maximally exhibiting functions of the universal microprocessor 11 by using an art for optimizing the above universal microprocessor.

As described above, it is possible to constitute the programmable controller of the first embodiment by using the universal microprocessor 11 comparatively inexpensive and easily available without designing or developing an exclusive microprocessor as an ASIC and execute sequential processing at a higher speed in accordance with the acceleration mounting art of the universal microprocessor 11.

Moreover, the control-program-development supporting apparatus of the first embodiment makes it possible to obtain the execution code 9 directly executable by the above universal microprocessor 11 by compiling a control program described with a sequential-processing language. Therefore, it is possible to make a programmable controller which mounts the universal microprocessor 11 execute sequential processing by transferring the execution code 9 to the controller and effectively use resources of past control programs. Moreover, it is possible to obtain the execution code 9 by replacing a compiler 100 to be used between programmable controllers that mount different types of universal microprocessors 11. Therefore, it is unnecessary to develop a control program for each maker or model of a programmable controller, uniformly manage control programs describing the same-content sequential processing, and reduce the development time and debugging time.

The control-program-development supporting apparatus of second embodiment is described below. The control-program-development supporting apparatus of the second embodiment makes it possible to divide a control program described with a sequential-processing language such as an instruction list into a plurality of program files at a predetermined position and corrects and compiles only each of the divided program files.

Figure 3:
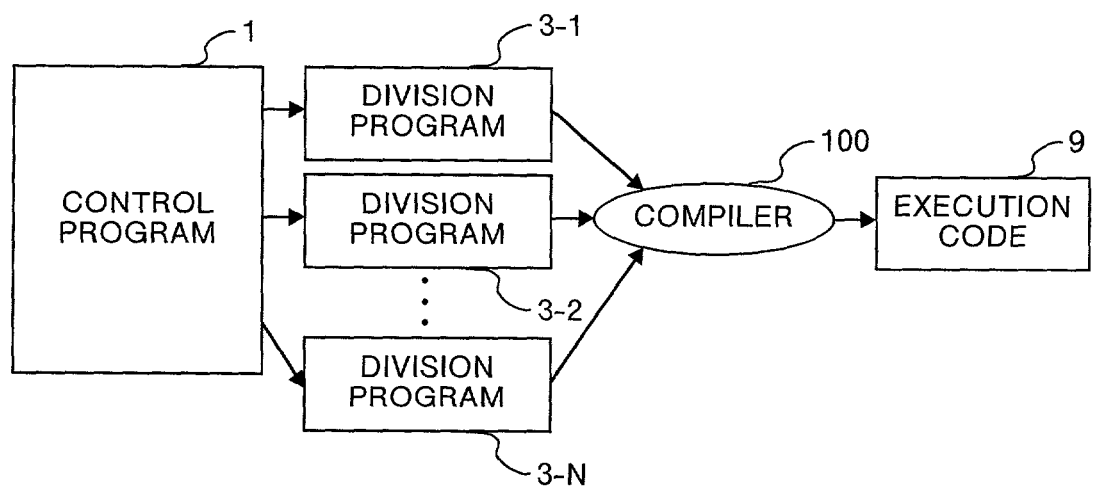
FIG. 3 is an illustration for explaining the generation of an execution code followed by division of a control program in a control-program-development supporting apparatus of a second embodiment.

FIG. 3 is an illustration for explaining the generation of an execution code followed by division of a control program by the control-program-development supporting apparatus of the second embodiment. As shown in FIG. 3, the control-program-development supporting apparatus divides a control program 1 described with a sequential-processing language such as a ladder diagram or instruction list already developed or newly develop and conventionally handled as one program file into a plurality of division programs 3-1 to 3-N in accordance with a division algorithm to be mentioned later.

Then, the division algorithm is described below. A control program is divided in order to shorten the time necessary for recompiling when a control program should be modified. However, division should not be performed which greatly impedes the optimization to be performed by the compiler 100. When dividing a control program, it is impossible to obtain a completely optimum execution code compared to a case of compiling a control program not divided at all. Therefore, it is necessary to output a code close to a completely optimum execution code, that is, a code for minimizing the degradation of an optimization level when dividing a control program.

Therefore, for the division algorithm, the following three methods are considered. That is, (1) a method of performing a division at a gap between rungs (hereafter referred to as rung dividing method), (2) a method of performing division at a subroutine serving as a jump destination (hereafter referred to as jump-destination dividing method), and (3) a method of performing division of putting input devices or output devices used together every unit (hereafter referred to as unit dividing method).

Figures 4, 5:
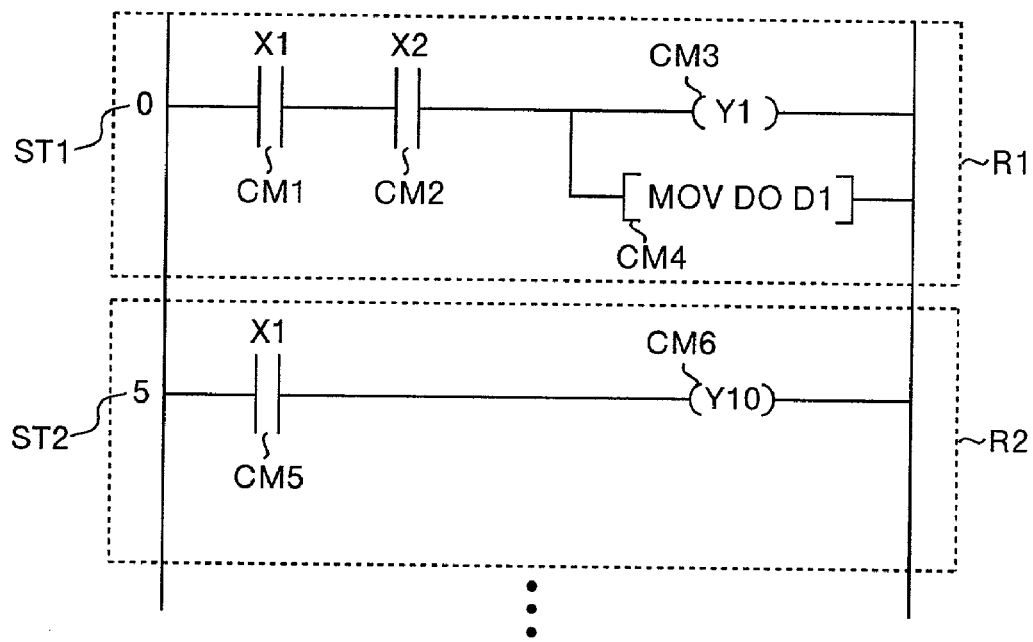
FIG. 4 is an illustration showing a ladder diagram.
FIG. 5 is a table showing the relation between the number of steps and a divided file in the control-program-development supporting apparatus of the second embodiment.

Particularly, because these three types of division algorithms are based on the expression of a ladder diagram, the ladder diagram is first described below. FIG. 4 is an illustration showing a ladder diagram. In FIG. 4, instructions CM1 to CM6 correspond to commands used for sequential operations. Particularly, in FIG. 4, instructions CM1, CM2, and CM5 denote inputs, CM3 and CM6 denote outputs, and CM4 denotes arithmetic processing. Moreover, in the case of a ladder diagram, a collection of instructions from input to output is expressed as one circuit block that is referred to as a rung.

FIG. 4 shows two rungs R1 and R2. Moreover, the number of steps showing the processing time of an instruction by a specific unit is provided for each rung. In the case of the rung R1 in FIG. 4, the number of steps at the head of the next rung R2 is set to 5 because one step is necessary for read of data to an address assigned into an input port, one step is necessary for write of data in an address assigned to an output port, and two steps are necessary for a MOV instruction for moving data between addresses.

That is, in the case of the rung R1, memories X1 and X2 are used as input devices and a memory Y1 is used as an output device. Moreover, in the case of the rung R2, a memory X1 is used as an input device and a memory Y10 is used as an output device.

(1) Rung Dividing Method

The rung dividing method is a method for dividing a control program at a gap between rungs expressed by the above ladder diagram. By dividing the control program at a gap between rungs, it is possible to effectively use the arrangement of devices to a register and control deterioration of the optimization effect due to division.

It is possible to consider sequential processing as a collection of rungs and it is the rung processing to perform a sequential operation given to the information of an input device and obtain the value of an output device. Therefore, to accelerate sequential processing, it is necessary to accelerate the processing in each rung. Moreover, when dividing one rung at its middle, it is impossible to effectively use operation results up to the middle of rungs set in a register. Therefore, it is preferable to divide a control program at a gap between rungs.

Therefore, a high-speed operation is realized by arranging input and output devices in a register as many as possible by using the compiler 100. That is, it is necessary to positively effectively use a register by using the optimization function of a compiler.

However, when minutely dividing a control program every gap between rungs, the degree of optimization is lowered because the optimization function for outputting an out-of-ordered code is not used by the compiler 100 due to the optimum-instruction scheduling which is one of acceleration mounting arts in order to generate execution codes of the universal microprocessor described for the first embodiment.

Thus, it is preferable that the divided control programs, that is, the division programs 3-1 to 3-N respectively have a certain-degree size. Therefore, a position for division is designated every specified number of steps. For example, a control program is divided at a gap between rungs every multiple of 100 steps. When the position of a step of a multiple of 100 steps is not a gap between rungs, a control program is divided at a gap between rungs immediately after the position.

The division programs 3-1 to 3-N thus generated are respectively managed as an individual program file so that these division programs can be independently compiled. FIG. 5 is a table showing the relation between the number of steps and divided files. As shown in FIG. 5, each division program is provided with a divided-file name and moreover, the number of steps corresponding to a rung of the original control program 1 is assigned to each file.

When the control program must be corrected, the control program 1 before divided is corrected on, for example, a ladder diagram. The above table is effectively used to extract the number of steps at an actually-corrected part of the control program 1 and specify the file name of a division program including the corrected part.

Figure 6:
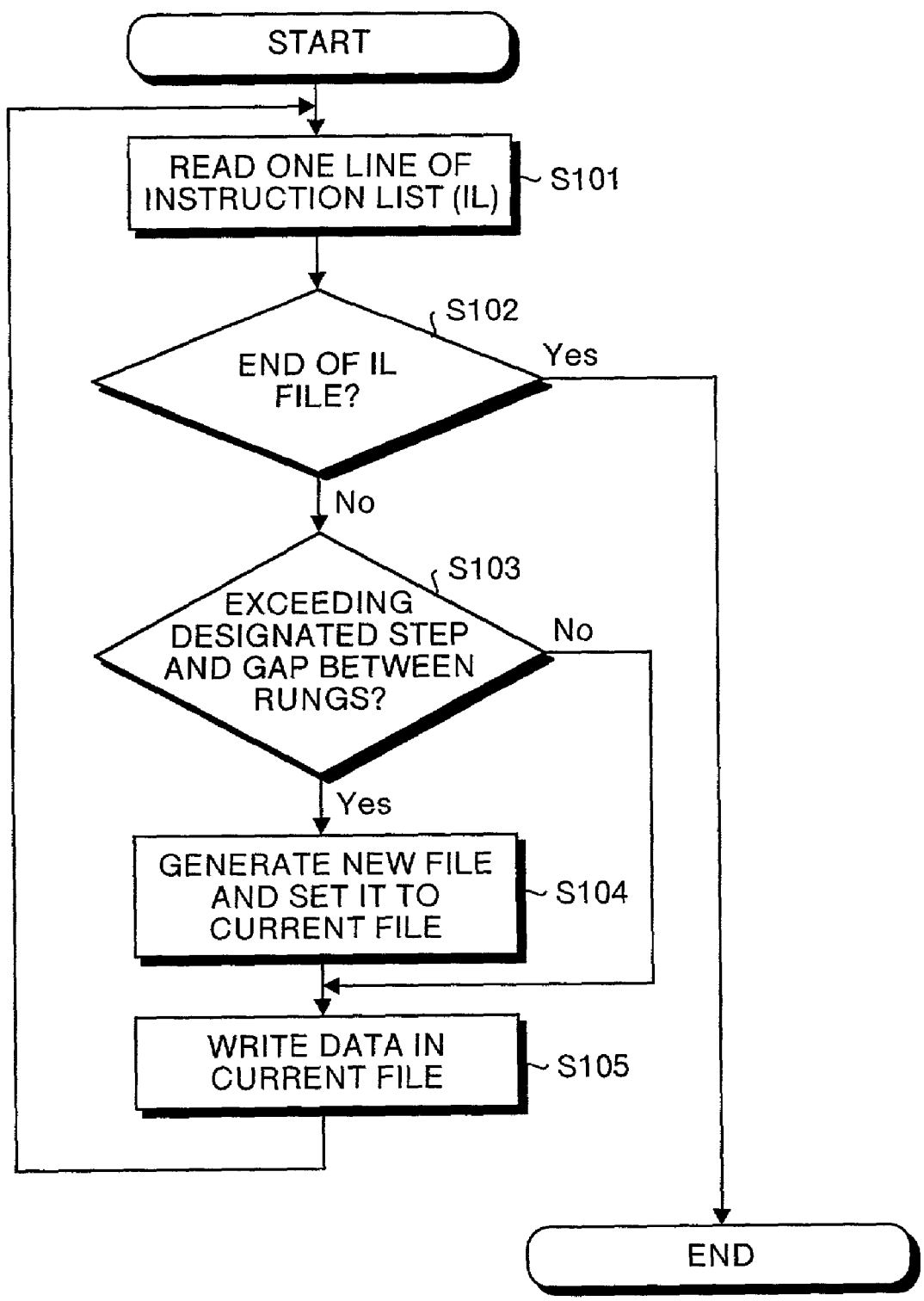
FIG. 6 is a flowchart showing the processing by the rung dividing method in the control-program-development supporting apparatus of the second embodiment.

Then, a specific processing flow of the rung dividing method is described below. FIG. 6 is a flowchart showing the processing of the rung dividing method. In FIG. 6, dividing means such as a computer program for executing the rung dividing method reads one line of converting an instruction list (hereafter referred to as IL) serving as the control program 1, particularly, an IL file that is obtained by conversion of a ladder diagram (step S101). When the read one line shows the end of the IL file, the processing is completed (Affirmative in step S102).

However, when the read one line does not show the end of the IL file (Negative in step S102) but the line corresponds to a designated number of steps or more and it is present at a gap between rungs (Affirmative in step S103), a new file is generated and set to a current file (step S104). Whether one line is not present at a gap between rungs or not is determined in accordance with the type of an instruction. That is, a position where an instruction to be input appears immediately after an instruction to be output serves as a gap between rungs. Moreover, a file to be newly generated is provided with a unique name.

Then, the read one line is written in an already-set current file (step S105) to repeat the processings in and after step S101 again. That is, when the read one line is not present at a gap between rungs (Negative in step S103) or when the one line does reach a designated number of steps, the one line is successively written in the current file. Thereby, a file is generated at a gap between rungs every range of a predetermined number of steps. This file is the divided file generated correspondingly every above division program.

(2) Jump-destination Dividing Method

The jump-destination dividing method is a method for dividing a control program at a gap between rungs expressed by the above ladder diagram and also at a subroutine serving as the jump destination of a jump instruction. Thereby, it is possible to consider the optimization that influences the jump instruction.

FIG. 7 is a table showing the relation between a jump-destination label name and a divided file. As shown in FIG. 7, each division program is provided with a divided-file name and moreover, a label name showing the jump destination of a jump instruction is assigned to each file.

The table shown in FIG. 7, similar to the table shown in FIG. 5, is also effectively used to extract the label name of a subroutine including an actually corrected part in the control program 1 and specify the file name of a division program corresponding to the subroutine.

Figure 8:
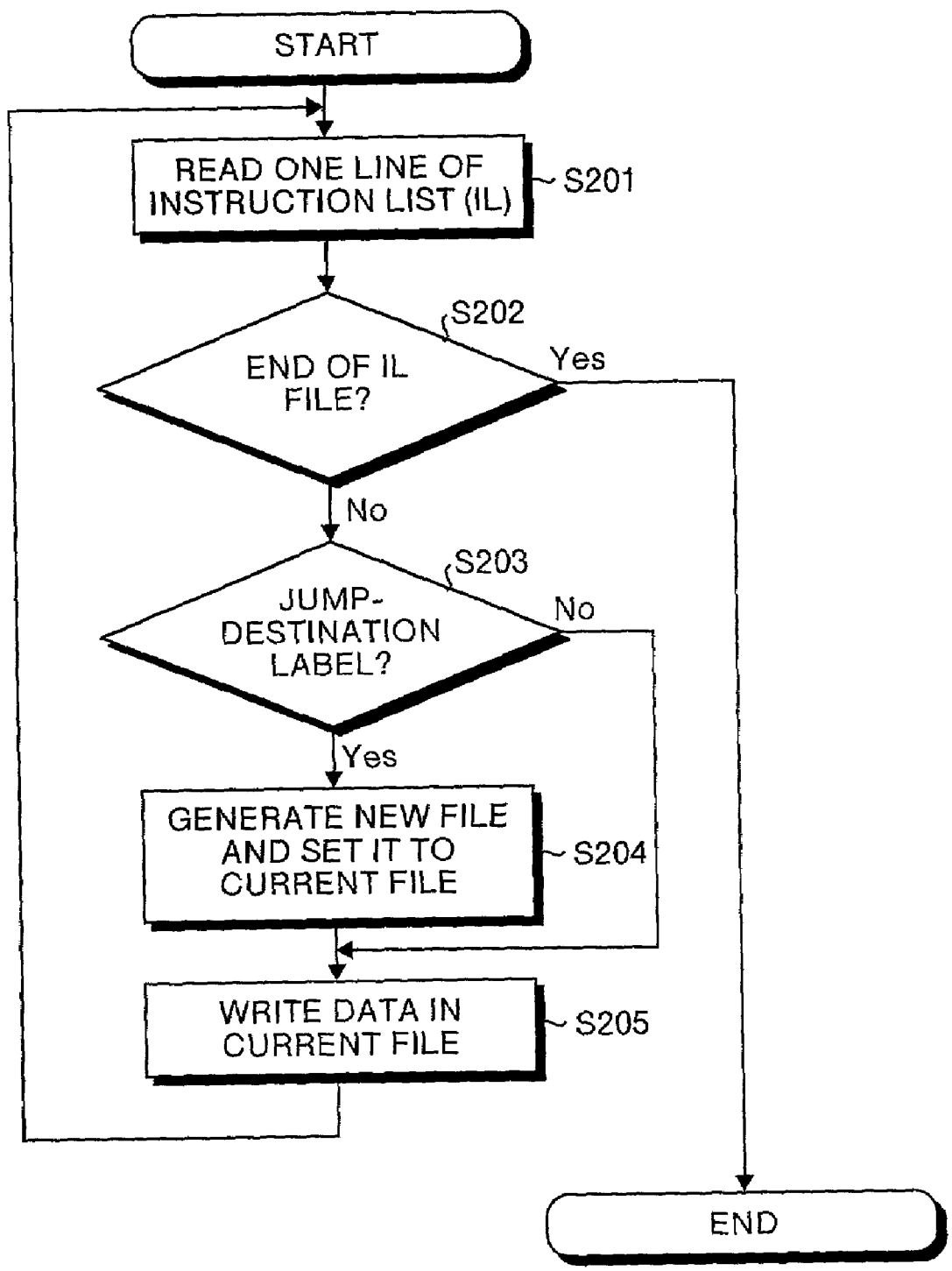
FIG. 8 is a flowchart showing the processing by the jump-destination dividing method in the control-program-development supporting apparatus of the second embodiment.

Then, a specific processing flow of the jump-destination dividing method is described below. FIG. 8 is a flowchart showing the processing of the jump-destination dividing method. In FIG. 8, dividing means of a computer program or the like for executing the jump-destination dividing method first reads one line of an IL serving as the control program 1, particularly an IL file obtained by converting a ladder diagram (step S201) When the read one line shows the end of the IL file, the processing is completed (Affirmative in step S202).

However, when the read one line does not show the end of the IL (Negative in step S202) but it shows a gap between rungs and a jump-destination label (Affirmative in step S203) a new file is generated and set to a current file (step S204) A method for determining whether the line shows a gap between rungs and a method for deciding a file name are the same as the case of the above rung dividing method.

Then, the read one line is written in an already-set current file (step S205) and processings are repeated again starting with step S201. That is, when the read one line does not show the gap between rungs or the head of a jump-destination subroutine, the one line is successively written in the current file. Thereby, a file is generated every while the label name of a jump destination is attached. This file is a divided file generated correspondingly every division program described above.

(3) Unit Dividing Method

The unit dividing method is described below. In the case of sequential processing, an input device and an output device used are generally different every a plurality of units constituting a fabrication line. Change of control programs performed at a fabrication site has a characteristic that the change greatly depends on a unit such as change of input devices connected to the unit. Therefore, in the case of the unit dividing method, rungs corresponding every unit are put together and output to a file.

Figure 9:
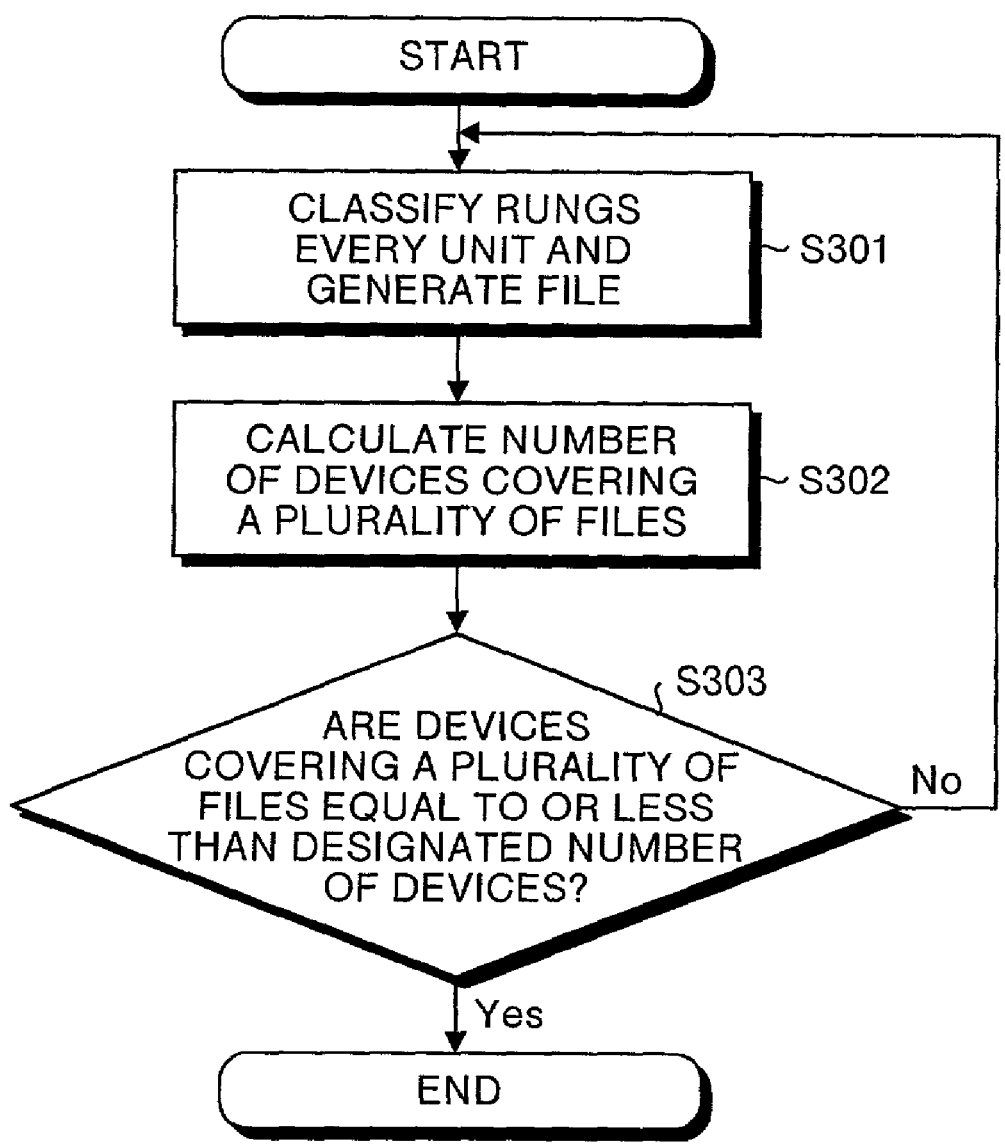
FIG. 9 is a flowchart showing the processing by the unit dividing method in the control-program-development supporting apparatus of the second embodiment.

Then, a specific processing flow of the unit dividing method is described below. FIG. 9 is a flowchart showing the processing of the unit dividing method. In FIG. 9, rungs showing a gap between rungs and the sequential processing in the same unit are first extracted and classified. Then, a plurality of rungs classified for each unit are put together to generate a file corresponding to each unit (step S301).

The numbers of input devices and output devices used for these files are calculated (step S302). When the calculated number of devices is a designated number of devices or less, the files generated in step S301 are assumed as a result of dividing the control program 1 into a plurality of division programs 3-1 to 3-N (Affirmative in step S303). However, when a calculated number of devices is larger than the designated number of devices, classification of units is repeated again in step S301 by narrowing down the range of the number of rungs serving as a criterion of division (negative in step S303).

Because some devices for handling sensor information may be used for a plurality of units, it is difficult to completely classify the devices by rungs so that the units are not duplicated. However, as the processing shown by the above flowchart, by controlling the number of devices used between divided files after division, it is possible to control the reduction of the optimization effect described for the rung dividing method. Moreover, it is allowed for a user to classify rungs every unit described above.

Therefore, the control-program-development supporting apparatus of the second embodiment can use any one of three types of division algorithms as described above. The file of a plurality of division programs generated with the above algorithm is effectively used when the control program 1 must be corrected.

Figure 10:
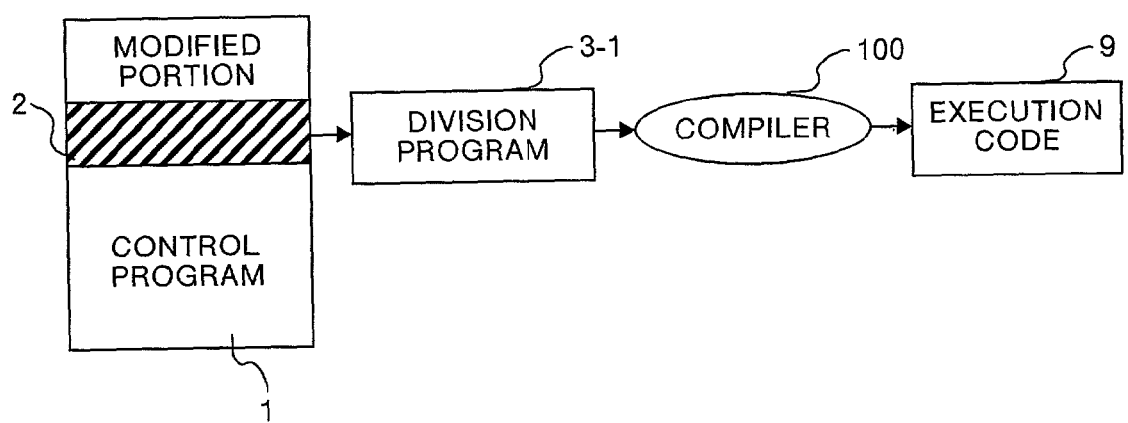
FIG. 10 is an illustration for explaining the generation of an execution code when a control program must be modified in the control-program-development supporting apparatus of the second embodiment.

FIG. 10 is an illustration for explaining the generation of an execution code when the control program 1 must be corrected. As shown in FIG. 10, for example, when a portion 2 is modified due to correction of the control program 1, only a file corresponding to the division program 3-1 including the modified portion 2 is recompiled by the compiler 100 to obtain an object file of only the portion. The object file is replaced with an object file corresponding to the division program 3-1 before corrected.

The newly generated object file is linked with other already-generated object file, that is, an object file corresponding to a not-modified division program by a linker and thereby, a new execution code 9 is generated.

As described above, according to the control-program-development supporting apparatus of the second embodiment, it is possible to obtain an execution code by dividing the control program 1 described with a sequential-processing language such as an instruction list into a plurality of programs at a position not influencing compiling and compiling each division program. Therefore, even if the control program 1 must be corrected, only a division program corresponding to the portion changed due to the correction is recompiled. Therefore, it is possible to shorten the compiling time when the correction occurs. Particularly, at a job site where a programmable controller is set, parts of the control program 1 to be corrected are concentrated on a specific portion. Therefore, when a control-program-development supporting apparatus such as a handy program loader is brought into a job site to perform maintenance, it is possible to shorten the maintenance time.

The above-described compiler 100 can use a compiler for generating an execution code of a universal microprocessor constructed by the acceleration mounting art as described for the first embodiment.

The control-program-development supporting apparatus of third embodiment is described below. The control-program-development supporting apparatus of the third embodiment obtains an execution code by converting a plurality of division programs generated by the second embodiment into files respectively described with an advanced programming language by a converter and compiling a file of the advanced programming language.

Figure 11:
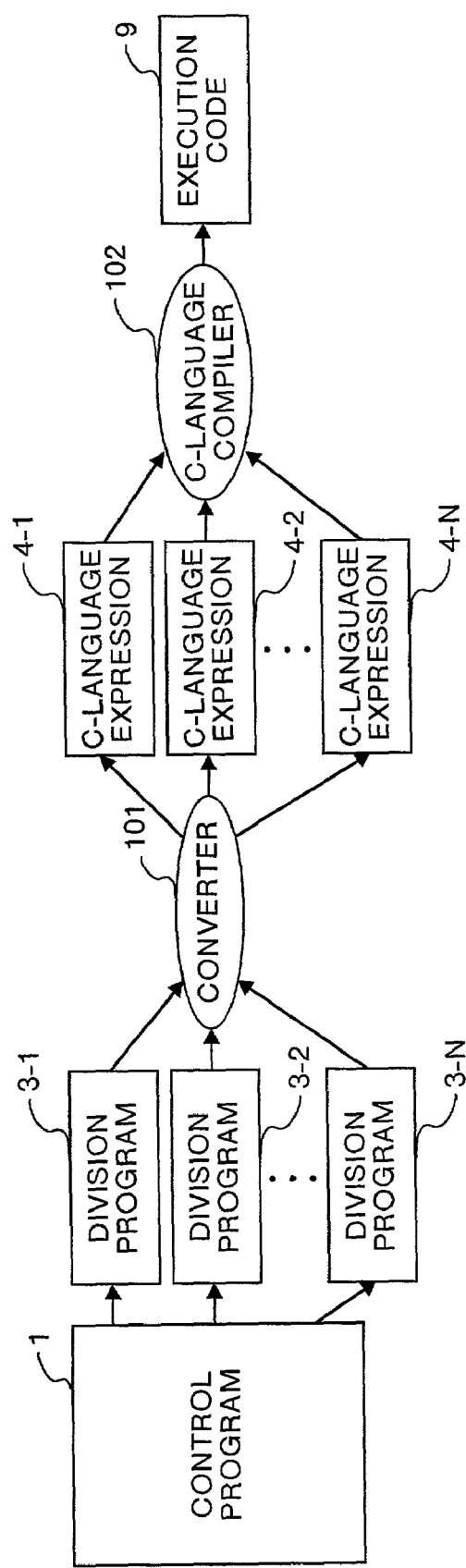
FIG. 11 is an illustration for explaining the generation of an execution code followed by division of a control program and conversion of the program into an advanced programming language in a control-program-development supporting apparatus of a third embodiment.

FIG. 11 is an illustration for explaining the generation of an execution code followed by division of a control program and conversion to an advanced programming language. As shown in FIG. 11, processings until dividing the control program 1 into a plurality of division programs 3-1 to 3-N are the same as the case of the second embodiment.

The control-program-development supporting apparatus of the third embodiment is different from the control-program-development supporting apparatus of the second embodiment in that the division programs 3-1 to 3-N are input to a converter 101 and converted into files of a plurality of advanced programming languages by the converter 101. Particularly, FIG. 11 shows a case of using C language as an advanced programming language, in which the division programs 3-1 to 3-N are converted into files 4-1 to 4-N respectively described with C language.

The files 4-1 to 4-N described with C language generated by the converter 101 are respectively handled as an independent program file and input to a C-language compiler 102. The C-language compiler 102 respectively compiles these program files described with C language to generate object files and thereby, the execution code 9 is obtained. The execution code 9 is actually generated by linking a plurality of object files generated by the C-language compiler 102 by a not-illustrated linker.

Figure 12:
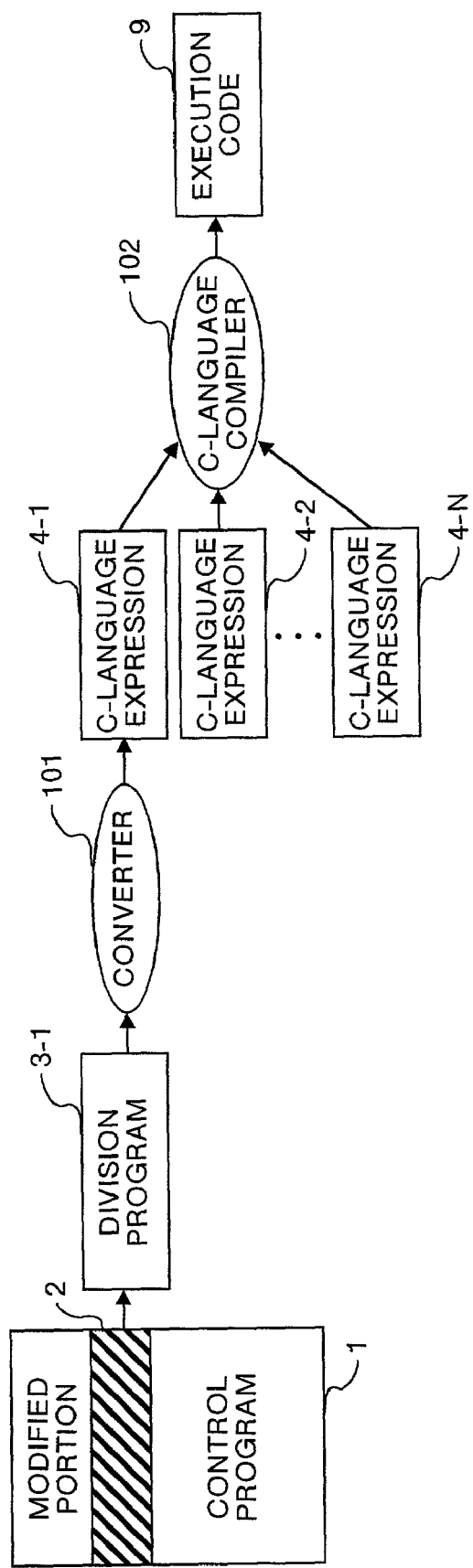
FIG. 12 is an illustration for explaining the generation of an execution code when a control program to be once converted into an advanced programming language must be modified in the control-program-development supporting apparatus of the third embodiment.

FIG. 12 is an illustration for explaining the generation of an execution code when the control program 1 must be corrected. As shown in FIG. 12, when a part corresponding to a modified portion 2 of the control program 1 must be corrected, it is possible to modify the program file 4-1 described with C language corresponding to the division program 3-1 including the modified portion 2 by directly operating the program file 4-1. When a correction range is large, it is also allowed to generate a division program gain by directly modifying the control program 1.

When the correction is completed, only the modified program file 4-1 described with C language is recompiled by the C-language compiler 102 to obtain an object file corresponding to the division program 3-1. The object file is replaced with an object file corresponding to the division program 3-1 before corrected.

Moreover, the above newly-generated object file is linked with an object file corresponding to other already-generated object file, that is, an object file corresponding to a division program not modified by a linker and thereby, a new execution code 9 is generated.

In the case of examples shown in FIGS. 11 and 12, it is assumed that the control program 1 is already divided into a plurality of division programs 3-1 to 3-N at the front stage of the converter 101. However, it is also allowed to divide the control program 1 when it is converted into an advanced programming language such as C language without generating the division programs 3-1 to 3-N.

Figure 13:
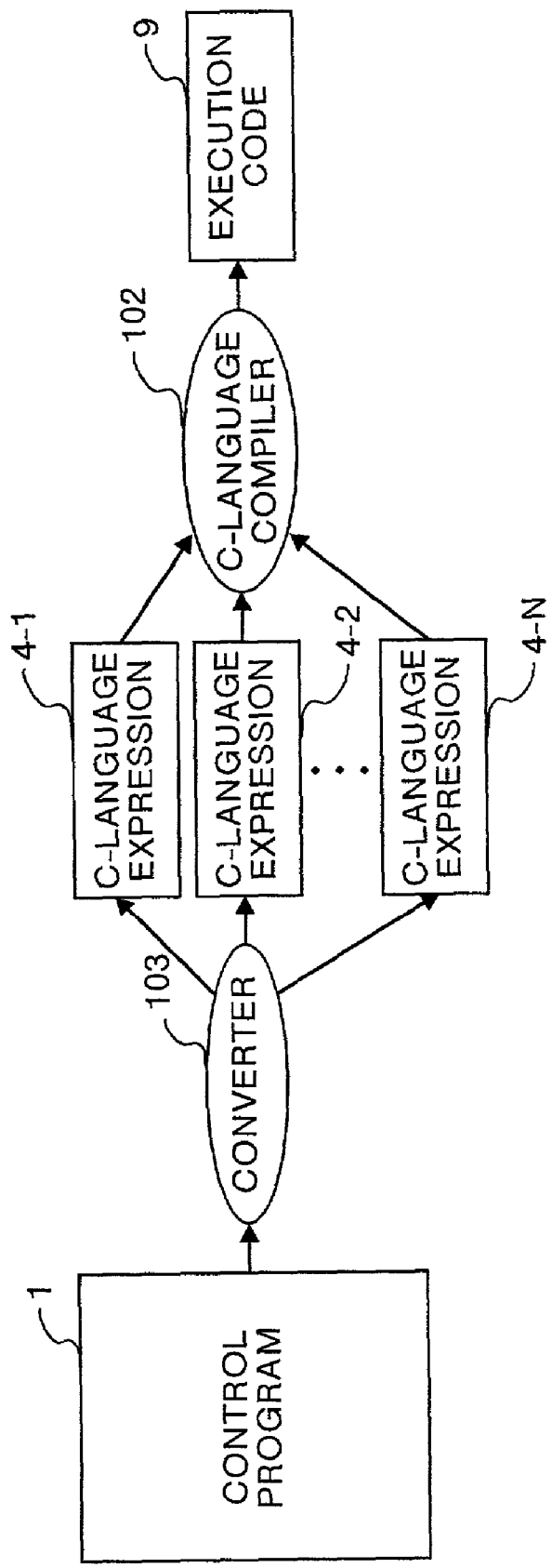
FIG. 13 is an illustration for explaining the generation of an execution code when a converter divides a control program and converts the program into an advanced programming language in the control-program-development supporting apparatus of the third embodiment.

FIG. 13 is an illustration for explaining the generation of an execution code when a converter divides the control program 1 and converts the program 1 into an advanced programming language. As shown in FIG. 13, no division program is generated but a converter 103 divides the control program 1 into a plurality of program files 4-1 to 4-N respectively described with C language. These program files 4-1 to 4-N have the same contents as those shown in FIG. 11. That is, as the internal processing of the converter 103, the converter 103 once divides a control program into a plurality of division programs in accordance with the code system of an instruction list and converts each division program into an advanced programming language.

Figure 14:
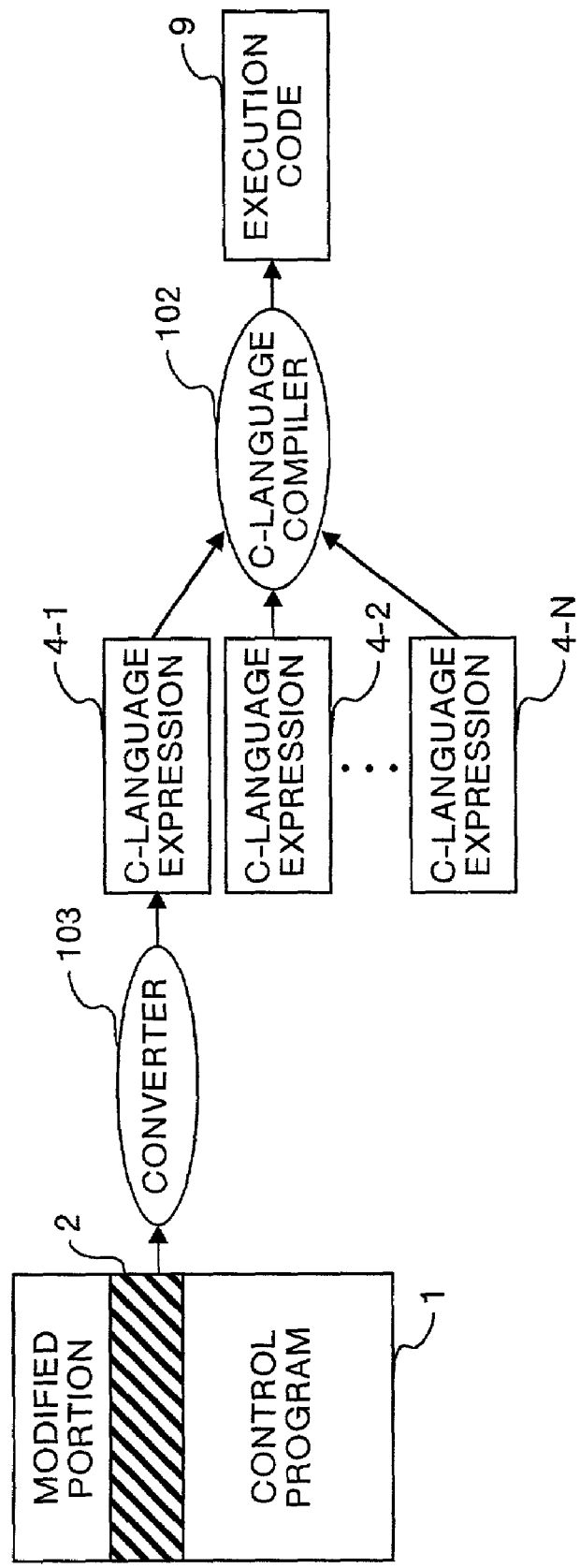
FIG. 14 is an illustration for explaining the generation of an execution code when a control program must be modified when a converter divides the control program and converts the program into an advanced programming language in the control-program-development supporting apparatus of the third embodiment.

FIG. 14 is an illustration for explaining the generation of an execution code when the control program 1 must be corrected in a case in which a converter divides the control program 1 and converts the program 1 into an advanced programming language. As shown in FIG. 14, when a part corresponding to a modified portion 2 of the control program 1 must be corrected, it is possible to modify the program file 4-1 described with C language corresponding to a division program including the modified portion 2 by directly operating the file 4-1. When the correction range is large, it is also allowed to generate a re-divided program file described with C language by directly modifying the control program 1.

When the correction is completed, only the modified program file 4-1 described with C language is recompiled by the C-language compiler 102 to obtain an object file. Generation of a new execution code 9 is described for FIG. 12.

As described above, the control-program-development supporting apparatus of the third embodiment obtains an execution code by dividing the control program descried with a sequential-processing language such as an instruction list into a plurality of programs at a position not influencing compiling and moreover converting the division programs into an advanced programming language such as C language. Therefore, it is possible to enjoy advantages obtained with the second embodiment. Moreover, when a correction is necessary, it is possible to obtain a purposed execution code by modifying a program file described with an advanced programming language and further shorten the time necessary for development or debugging of a control program.

The control-program-development supporting apparatus of fourth embodiment is described below. The control-program-development supporting apparatus of the fourth embodiment obtains a compact and optimum execution code from a compiler by once reconstituting codes with an optimization filter before inputting a control program such as an instruction list to the compiler or converter described in connection to the first to third embodiments.

Figure 15:
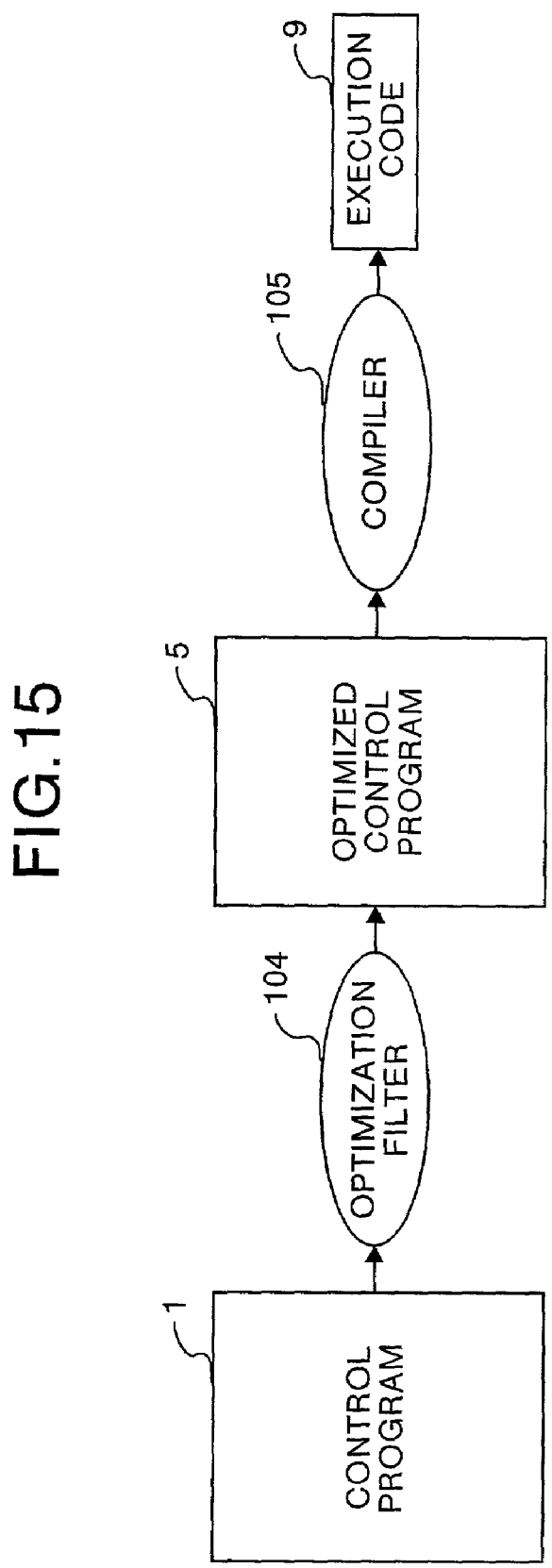
FIG. 15 is an illustration for explaining the generation of an execution code of a control-program-development supporting apparatus of a fourth embodiment.

FIG. 15 is an illustration for explaining the generation of an execution code of the control-program-development supporting apparatus of the fourth embodiment. As shown in FIG. 15, optimization processing is applied to a control program 1 by an optimization filter 104 before inputting the program 1 to a compiler 105. The optimization filter 104 performs optimization without modifying the sequential-processing content of the original control program 1 and outputs an optimized control program 5 by excluding not-cited variables and redundant codes, recombining logics, and replacing sequences for locally arranging instructions for common input and output devices. Particularly, for optimization, by collecting devices to be accessed and instructions to be used nearby in the control program 1, it is possible to provide locality for a program and improve the execution efficiency of an execution code after compiled.

Because the execution-code generation shown in first to third embodiments can be applied to the flow of the processings until the execution code 9 is generated from the optimized control program 5, the description of this processing is omitted.

As described above, the control-program-development supporting apparatus of the fourth embodiment reconstitutes the code system of the control program 1 described with a sequential-processing language such as an instruction list before inputting the program 1 to the compiler 105, it is possible to generate more-compact and optimum execution code 9 by the rear-stage compiler 105.

The control-program-development supporting apparatus of fifth embodiment is described below. The control-program-development supporting apparatus of the fifth embodiment prepares a sample program whose execution time is already known and estimates an actual execution time of an instruction or the like in development of a control program before compiled.

FIG. 16 is a relating table showing instructions, in the control-program-development supporting apparatus of fifth embodiment, that is, sample programs, their sizes, and their processing times. As shown in FIG. 16, various instructions are used and samples of control programs of various sizes and their execution times are prepared. In general, it is difficult to estimate the processing time of an execution code generated by being compiled. Therefore, a program having a processing time closest to the above processing time is selected out of prepared sample programs and used as a criterion of the processing time of a generated control program. Estimation of processing time using the relating table shown in FIG. 16 can be also automatically performed with a computer program by the fact that one of the instructions shown in FIG. 16 determines a portion including by a predetermined rate as a portion approximated to the instruction.

As described above, according to the control-program-development supporting apparatus of the fifth embodiment, it is possible to estimate an actual execution time when developing or debugging the control program 1 such as an instruction list or the like. Therefore, it is easy to improve the processing speed of the whole sequential processing and obtain a time table.

The control-program-development supporting apparatus of sixth embodiment is described below. The control-program-development supporting apparatus of the sixth embodiment makes it possible to know a debugging portion of an advanced programming language corresponding to a portion of an original control program while the language is debugged in a processing system for once converting a control program described with a sequential-processing language such as an instruction list into an advanced programming language such as C language as described for the above third embodiment.

Figure 17:
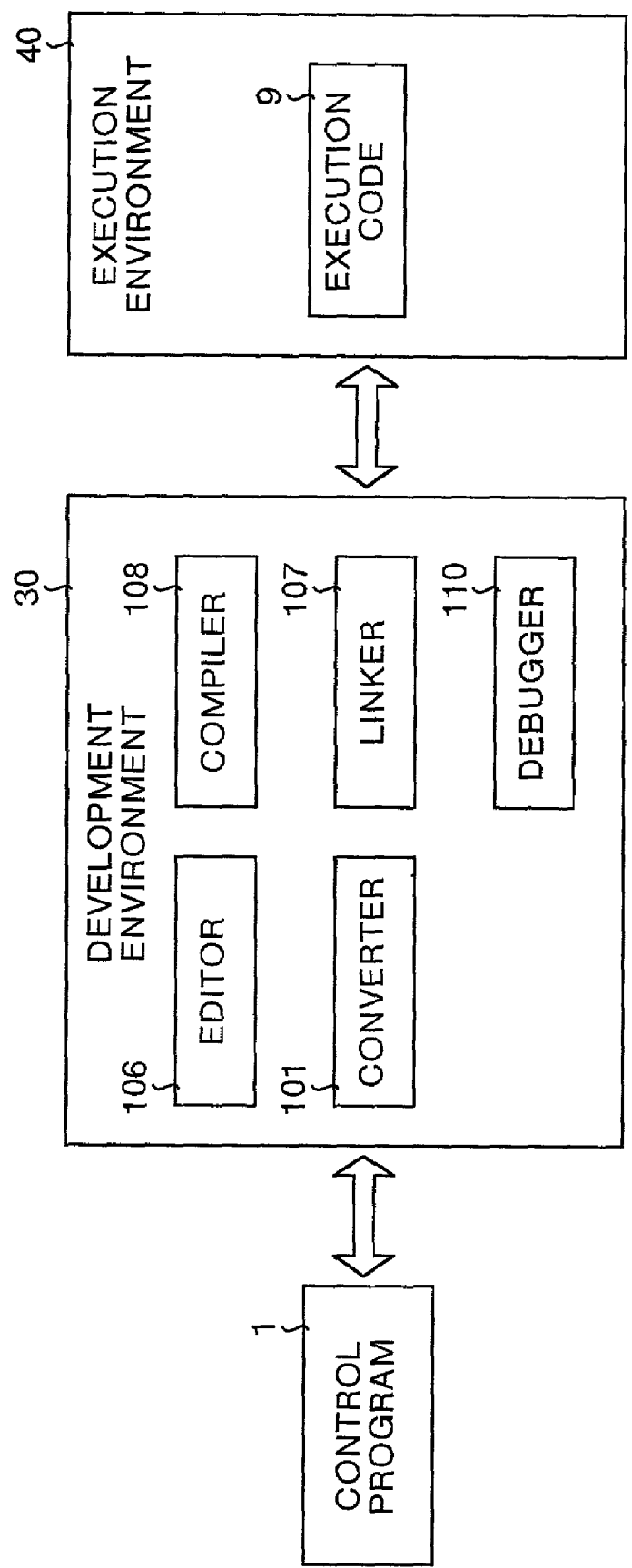
FIG. 17 is an illustration for explaining the development environment and execution environment of a control program in a control-program-development supporting apparatus of a sixth embodiment.

In this case, a control-program development environment for obtaining an execution code is first described. FIG. 17 is an illustration for explaining a development environment and an execution environment of a control program. As shown in FIG. 17, a development environment 30 is constituted of an editor 106, a converter 101, a debugger 110, a compiler 108, and a linker 107. The editor 106 serves as a tool for generating the control program 1 of a ladder diagram, an instruction list, or the source list of an advanced programming language obtained by converting the ladder diagram and the instruction list.

Because the converter 101, compiler 108, and linker 107 are the same tools as those described in connection to the first to fifth embodiments, their descriptions are omitted. The debugger 110 is a tool for debugging a generated control program. An execution environment 40 is a section for actually executing the execution code 9 generated in the development environment 30, which is allowed to use a compiling-type programmable controller or an emulator obtained by simulating the programmable controller on a control-program-development supporting apparatus.

Figure 18:
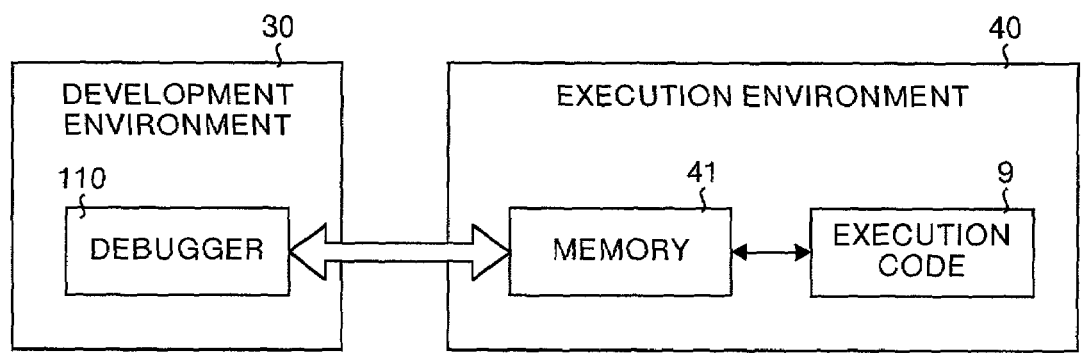
FIG. 18 is an illustration for explaining debugging of the control-program-development supporting apparatus of the sixth embodiment.

Because the control-program-development supporting apparatus of the sixth embodiment particularly has functions and advantages for debugging, the debugger 110 is described below in detail. FIG. 18 is an illustration for explaining the debugging operation. The debugger 110 has a monitoring function for each device described in the control program 1 currently executed, a step-executing function for step-executing a control program, a sampling tracing function, a status latching function, a breaking function for breaking when a variable (that is, device) shows a designated value, and a breakpoint setting function for setting a breakpoint in a control program.

The memory 41 shown in FIG. 18 is equivalent to the memory 14 of the programmable controller described in connection to the first embodiment. In general, in the case of a control-program-development supporting apparatus, the execution environment 40 is frequently realized by the above emulator. In this case, the memory 41 serves as a memory mounted on a control-program-development supporting apparatus.

The monitoring function is a function for referring to the value of a device while the control program 1 is executed and displaying it with graphical means such as a numerical value or graph. Moreover, the monitoring function makes it possible to rewrite the value of a device under execution.

Figure 19:
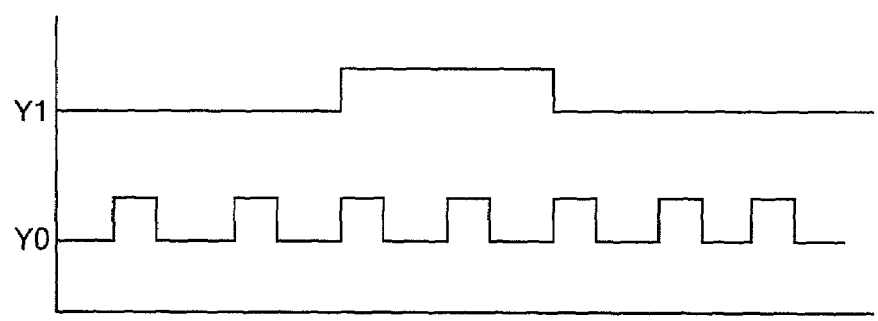
FIG. 19 is an illustration for explaining a sampling tracing function in the control-program-development supporting apparatus of the sixth embodiment.

Furthermore, the sampling tracing function is a function for recording the value of a device designated every scan. FIG. 19 is an illustration for explaining the sampling tracing function. As shown in FIG. 19, the sampling tracing function makes it possible to generate the timing chart of a designated device (in FIG. 19, output devices Y0 and Y1 are shown). In the sampling tracing, it is possible to secure a region for recording the value of a device in the debugger 110 and use a memory not currently used in an execution environment. Moreover, it is allowed to secure a sampling-tracing memory in an execution environment.

Figure 20:
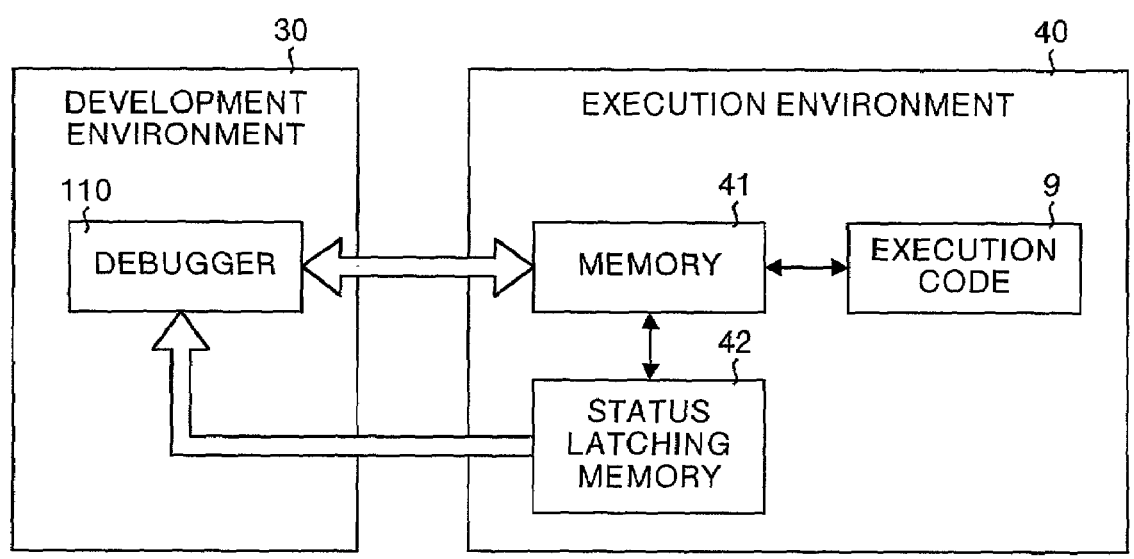
FIG. 20 is an illustration for explaining a status latching function in the control-program-development supporting apparatus of the sixth embodiment.

The status latching function is a function for recording values of all devices at a certain moment under execution. FIG. 20 is an illustration for explaining the status latching function. The timing (that is, trigger) for a device-value recording function to record the value is the time when a designated device reaches a designated value or it is possible for a user to manually input the timing from the debugger 110. When a trigger works, the content of a memory is copied to a status latching memory 42. The memory content stored in the status latching memory 42 can be monitored by the debugger 110.

Figure 21:
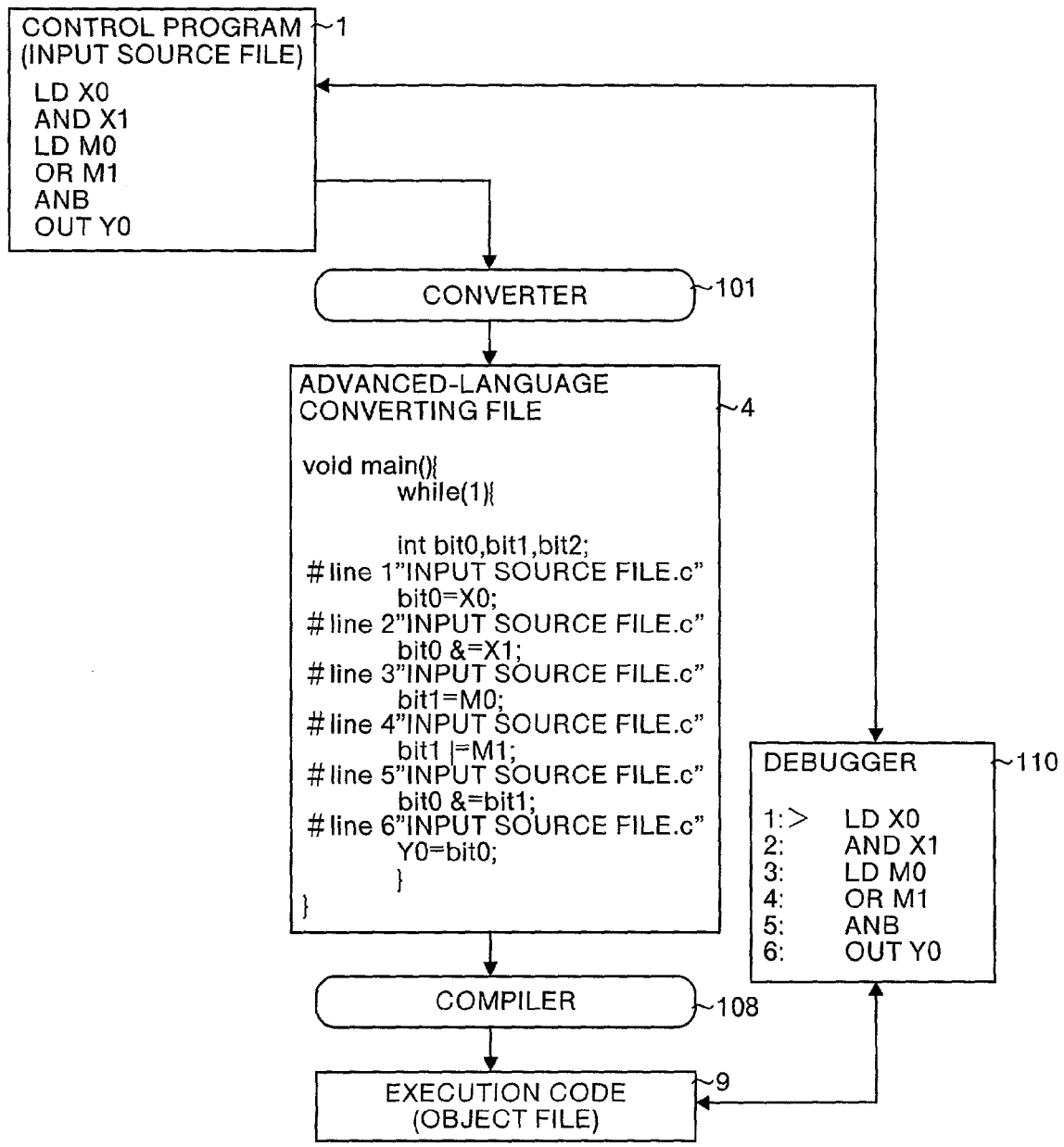
FIG. 21 is an illustration for explaining a debugging method in the control-program-development supporting apparatus of the sixth embodiment.

The debugging method that is a feature of this embodiment is described below. FIG. 21 is an illustration for explaining the debugging method. Hereafter, a system is considered which generates the execution code 9 by converting an input source file described with an instruction list, that is, the control program 1 into an advanced-language converting file 4 described with an advanced programming language such as C language by the converter 101 and compiling the advanced-language converting file 4 by the compiler 108.

First, the converter 101 inserts the information for line number of each instruction list constituting the control program 1 into a corresponding portion in the advanced-language converting file 4 when converting the control program 1 into the advanced-language converting file 4. As illustrated, this processing can be realized by a compiler instruction "#line" for recognizing line numbers of the source file of a general C-language processing system.

The compiler instruction "#line" is a special instruction for a compiler, that each line of the source file of C language corresponds to each line of another source file. General C-language compilers such as Gnu C Compiler of Free Software Foundation and Visual C/C++ Compiler of Microsoft Corp. also support the above function and the syntax of them is shown as #line line number "source file name".

Thus, by embedding a compiler instruction corresponding to each line of an original instruction-list source and compiling the instruction by the compiler 108 such as the above Gnu C or Visual C, it is possible to obtain an executable-type object file in which the line-number information of an input source file is embedded, that is, the execution code 9.

By step-executing the execution code 9 on a Gnu Debugger (gdb) in the case of Gnu C or a debugger attached to the integrated development environment VisualStudio of Microsoft Corp. in the case of Visual C, the original control program 1 is read on each debugger and it is possible to step-execute the control program 1 every line on the program 1.

As described above, according to the control-program-development supporting apparatus of the sixth embodiment, the description of a part corresponding to each instruction of the original control program 1 is inserted into the advanced-language converting file 4 of the advanced programming language obtained by converting the control program 1 described with a sequential-processing language such as an instruction list. Therefore, the control-program-development supporting apparatus of the sixth embodiment is effective particularly when a developer of a control program fully knows an advanced programming language such as C language though he/she is inexperienced in the description of an instruction list and vice versa and it is possible to shorten the developing time and debugging time of the control program.

Moreover, when correcting a program file described with an advanced programming language such as C language, it is possible to modify an original control program such as an instruction list at the same time. Therefore, it is possible to improve the consistency between the program file and the control program.

The programmable controller of seventh embodiment is described below. The programmable controller of the seventh embodiment receives and stores a binary patch generated in accordance with the difference data between control programs before and after modified to execute the binary patch and thereby, replaces an execution code currently execute with a new execution code at a predetermined timing of the sequential processing currently executed and continues the sequential processing according to the new execution code.

Figure 22A:
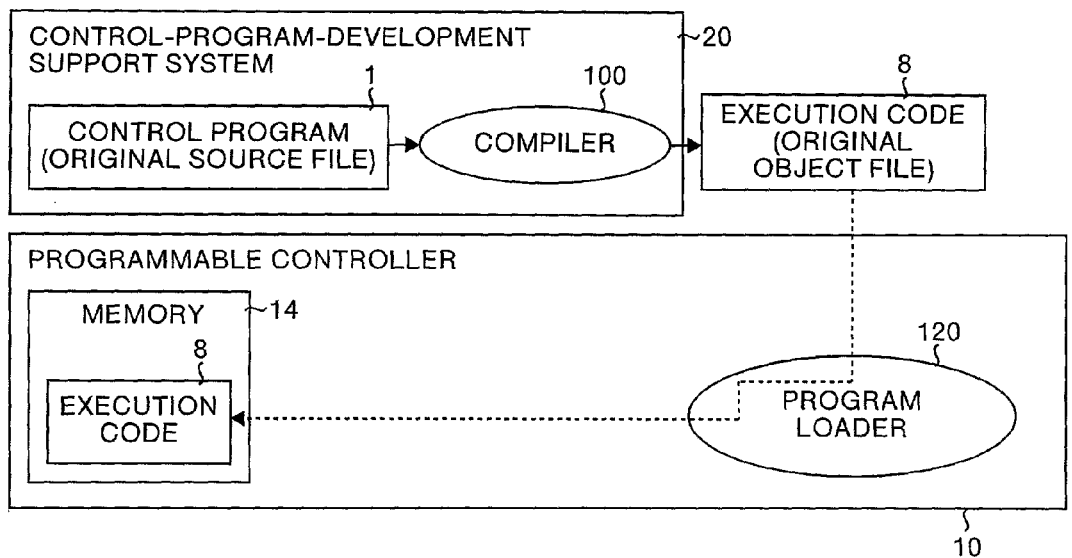
FIG. 22A and FIG. 22B are illustrations for explaining the replacement of an execution code using a binary patch in a programmable controller of a seventh embodiment.
Figure 22B:
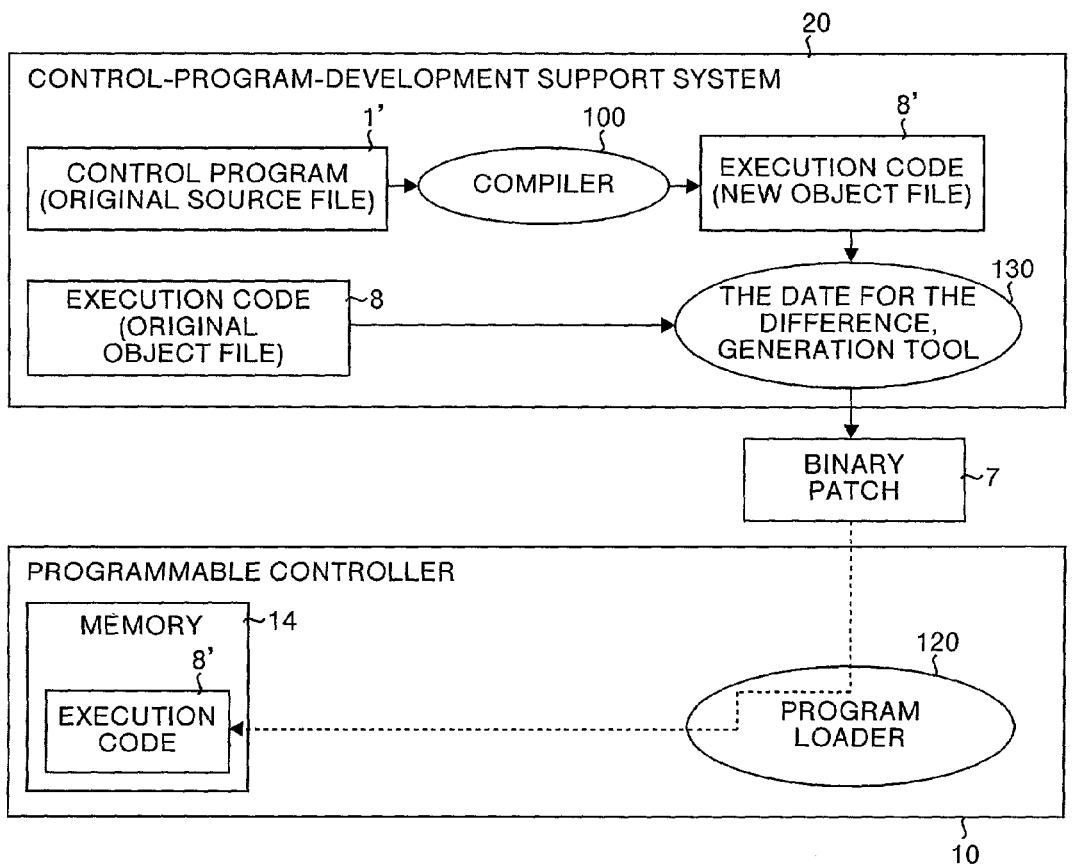

FIG. 22A and FIG. 22B are illustrations for explaining execution-code replacement using a binary patch in the programmable controller of the seventh embodiment. First, the processing for the programmable controller to receive and execute a new execution code is described below.

As shown in FIG. 22A an execution code 8 is first generated by the control-program-development supporting apparatus 20. Because generation of an execution code by the control-program-development supporting apparatus 20 is the same as the case of a conventional control-program-development supporting apparatus or the control-program-development supporting apparatuss of the first to sixth embodiments, its description is omitted.

The programmable controller 10 receives the execution code 8 through a not-illustrated communication interface and reads the code 8 in a memory 14 such as a work memory by a program loader 120. Thereby, the program controller 10 can start the sequential processing according to the execution code 8.

It is assumed that a control program 1 serving as the original source file of the execution code 8 is modified and resultantly a control program 1' is generated. Particularly, it is assumed that this modification is a local modification of the control program 1 before modified but completely new contents are not written from the beginning. In this case, an execution code 8' corresponding to the control program 1' is generated similarly to the case of the above execution-code generation. Then, the control-program-development supporting apparatus 20 reads the held execution code 8 before modified and generates the difference data between the execution code 8 and the modified execution code 8' with a difference-data generating tool 130.

The execution codes 8 and 8' are not text data shown by ASCII codes but they are object files shown by binary codes. Therefore, the difference between these execution codes as binary data is local such as the difference between the original control programs 1 and 1'. For example, if the compiler 100 only converts each line of the control program 1 before modified into a corresponding block position in an object file, the difference has only a value when a block is newly added to the nth block position or the nth block position is newly replaced with the above block.

Moreover, the difference is only a difference between test segments, data segments, or bss segments (not-initialized segments) in each execution code. The difference-data generating tool 130 extracts the above difference and outputs it as a file and the output difference data is referred to as a binary patch 7.

A patch denotes a technique for reproducing original data from a difference between files and its difference data generally used in the computer field, which generally generates a new text file in accordance with a difference between the so-called text files of the ASCII code. The binary patch performs the above operations for binary data.

However, the binary patch is applied to a file set on the so-called secondary memory such as a hard disk of a computer but it is not means to be applied to a program in a memory currently executed. However, the programmable controller of the seventh embodiment applies the binary patch 7 to an execution code under execution.

Therefore, the programmable controller 10 receives not the newly-generated execution code 8 but the binary patch 7 smaller than the code 8 in size through a not-illustrated communication interface and stores the code 8 in a non-volatile memory such as a flash memory.

In this case, the program loader 120 on the programmable controller 10 also functions as a patcher for applying a patch, reads information from the binary patch data 7 at a proper timing in repetitive looping of the execution code 8 under execution, and replaces codes of the execution code 8 under execution. That is, as described above, the program loader 120 performs insertion of a block into a certain block position, rewriting of a block, or insertion and rewriting for each segment. Moreover, when rewriting of an execution code is completed, the programmable controller 10 immediately executes the new execution code to continue sequential processing.

As described above, the programmable controller of the seventh embodiment automatically replaces an execution code under execution in accordance with difference data in which only a modifying portion of a control program is described and continues sequential processing according to a replaced new execution code. Therefore, it is enough to hold the binary patch 7 smaller than a changed execution code in size without holding the whole changed execution code in the programmable controller 10 like the conventional case.

The concept corresponding to modification of a control program by the above difference data can be also applied to a ladder diagram or instruction list in an interpreter-type programmable controller.

The control-program-development supporting apparatus of eight embodiment is described below. The control-program-development supporting apparatus of the eight embodiment inserts a compressed file of a control program before compiled into an execution code obtained by compiling it to unify an execution code and a control program.

Figure 23:
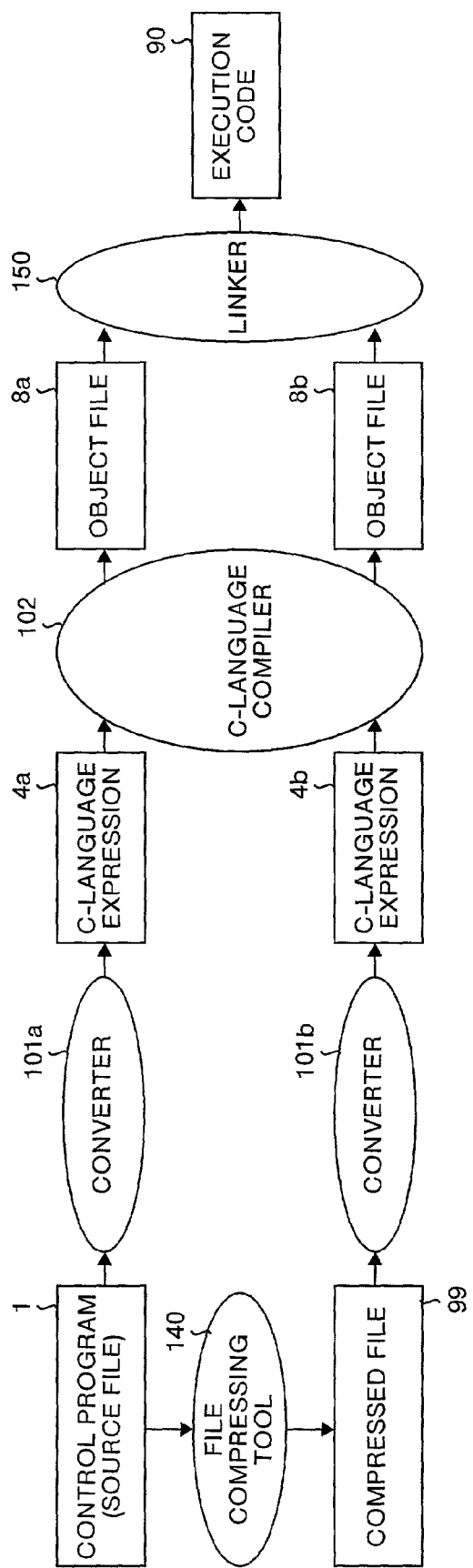
FIG. 23 is an illustration for explaining the generation of an execution code in a control-program-development supporting apparatus of an eighth embodiment.

FIG. 23 is an illustration for explaining the generation of an execution code by the control-program-development supporting apparatus of the eight embodiment. First, the control-program-development supporting apparatus converts a control program 1 such as an instruction list into an advanced programming language such as C language with a converter 101a and inputs a program file 4a described with C language obtained through the above conversion to a C-language compiler 102. Then, the C-language compiler 102 compiles the program file 4a described with C language and outputs an object file 8a.

Moreover, the control-program-development supporting apparatus compresses the control program 1 with a file compressing tool 140 to generate a compressed file 99. It is possible to use gzip, bzip2, or 1ha as the file compressing tool 140. The compressed file 99 compressed by the above tool results in not the text format of ASCII code but binary data.

The control-program-development supporting apparatus converts the compressed file 99 into a program file 4b described with C language with a converter 101b. The compressed file 99 is converted into a C-language expression with the converter 101b in order to include the source code of the compressed control program in a part of an execution code to be finally generated not as a mere attached file.

FIG. 24 is an illustration showing a source file that is the content of the control program 1. Moreover, FIG. 25 is an illustration showing a C-language expression obtained by converting the compressed file 99. The control program 1 expressed with an instruction list shown in FIG. 24 is converted into the compressed file 99 as binary data by the file compressing tool 140 as described above.

When the compressed file 99 is arranged like "01h, 02h, 03h, . . . " starting with the head data, it is converted into {0x01, 0x02, 0x03, . . . } which is the arrangement every one-bite data by the converter 101b. The arranged data shown in FIG. 25 is a conversion result to the source file shown in FIG. 24.

Thus, a compressed file is converted into a format which can be interpreted by the C-language compiler 102 to generate the program file 4b expressed by C language. Then, the C-language compiler 102 compiles the C-language-expressed program file 4b to output an object file 8b.

Two object files 8a and 8b generated by the C-language compiler 102 are linked each other by a liner 150 and one directly-executable execution code 90 can be finally obtained by a programmable controller. That is, the execution code 90 is constituted of a part for actually contributing to sequential processing and the information for the source code of the control program 1.

The execution code 90 thus obtained is generally stored in a nonvolatile memory or the like of a programmable controller. As shown in FIG. 25, however, because it is included in an execution code by assuming that the compressed data obtained by compressing the control program 1 has an arrangement with a name of _InputSource and the file name of the data is sample.il, gz, it is possible to extract the compressed file 99 in accordance with the name. Moreover, after the compressed file 99 is extracted, it is possible to restore the original control program 1 by using a developing tool corresponding to a compression format such as gunzip or bunzip generally provided for the file compressing tool 140.

As described above, the control-program-development supporting apparatus of the eight embodiment generates an execution code in which a part to contribute to actual sequential processing and the source-code information of the control program 1 such as an instruction list are united into one body. Therefore, it is possible to unify a control program and an execution code and store them in a programmable controller. Thus, when loosing a control program necessary for development or debugging or directly operating a control program from a programmable controller at a job site, it is possible to fetch the control program from an execution code and realize the consistency between the execution code and the control program.

The programmable controller and control-program-development supporting apparatus of ninth embodiment are described below. The control-program-development supporting apparatus of the first embodiment performs pattern matching of instructions of a control program starting with an instruction having the highest appearance frequency when interpreting the control program into execution codes while the control-program-development supporting apparatus of the ninth embodiment performs pattern matching of instructions of a control program starting with an instruction having the highest appearance frequency when compiling the control program into execution codes.

Figure 26:
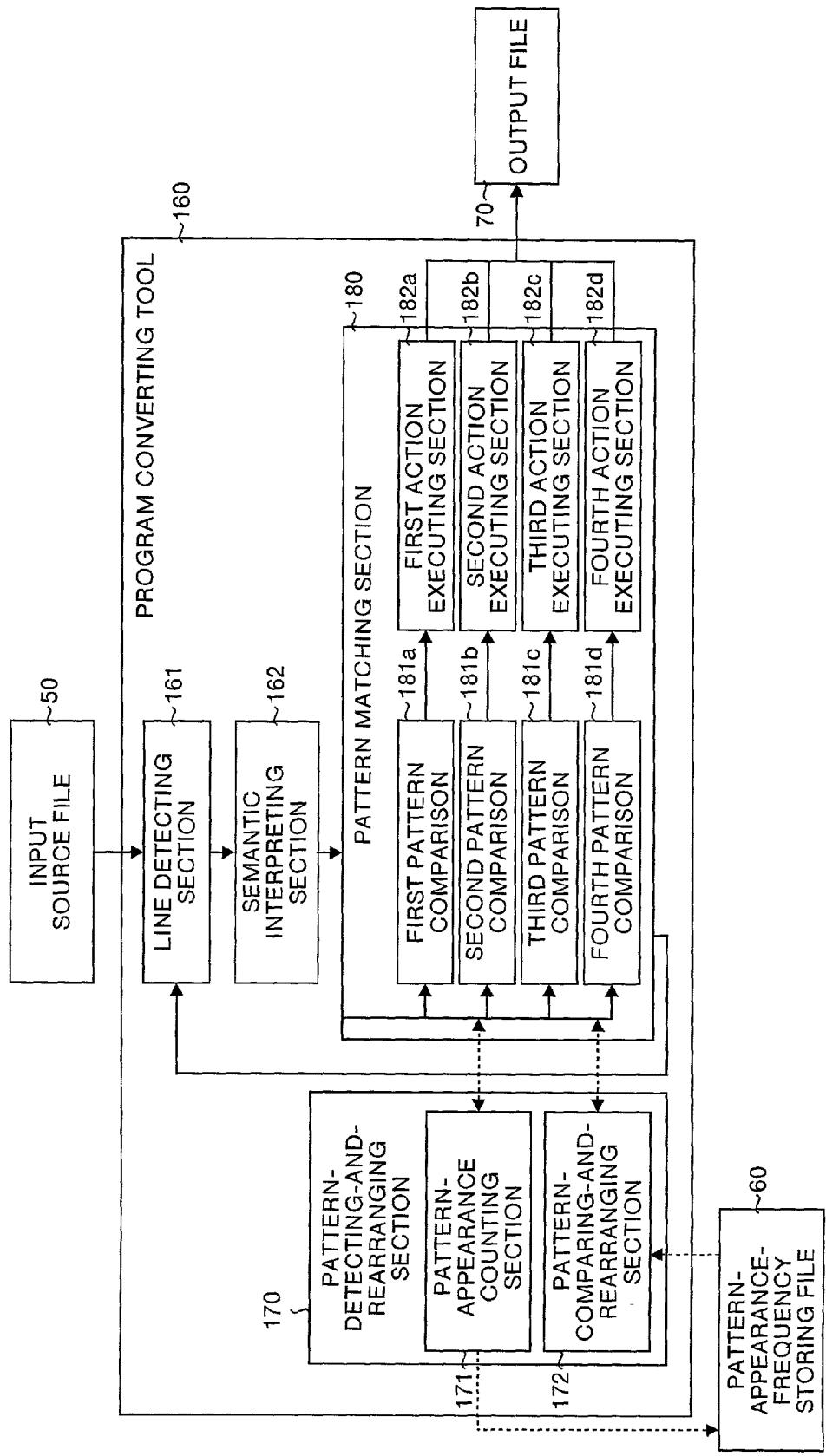
FIG. 26 is an illustration for explaining compiling in a control-program-development supporting apparatus of a ninth embodiment.

FIG. 26 is an illustration for explaining the compiling by the control-program-development supporting apparatus of the ninth embodiment. FIG. 26 particularly shows a system for converting an input source file 1 serving as a control program such as an instruction list described by a user and generating an output file 70 serving as an execution code directly executable by a programmable controller.

In general, an instruction list basically frequently uses an LD instruction and an OUT instruction, in which many biases are present in appearance frequencies of instructions because a user frequently uses a certain instruction when performing processings having the same content. Moreover, because many programs are diverted because of reliabilities based on their past results, biases of instructions used are also present due to the above mentioned.

Therefore, a program converting tool 160 corresponding to a compiler has a pattern-detecting-and-rearranging section 170. The pattern-detecting-and-rearranging section 170 has a pattern-appearance counting section 171 and a pattern-comparing-and-rearranging section 172. The pattern-appearance counting section 171 counts appearance frequencies of instructions when converting them with each program converting tool 160 and stores the frequencies in a pattern-appearance-frequency storing file 60.

The pattern-comparing-and-rearranging section 172 rearranges first to fourth pattern comparisons 181a to 181d of a pattern matching section 180 to a forward sequence of pattern matching starting with an instruction having the highest appearance frequency out of the pattern-appearance-frequency storing file 60. First to fourth action executing sections 182a to 182d corresponding to the pattern comparisons are naturally interlocked. Thereby, because an instruction having a higher appearance frequency is earlier pattern-matched, the time up to completion of processing is shortened. It is allowed that the rearrangement timing of the pattern-comparing-and-rearranging section 172 is the time when going out of the pattern matching section 180 and returning to a line detecting section 161 or the program converting tool 160 is started.

Figure 27:
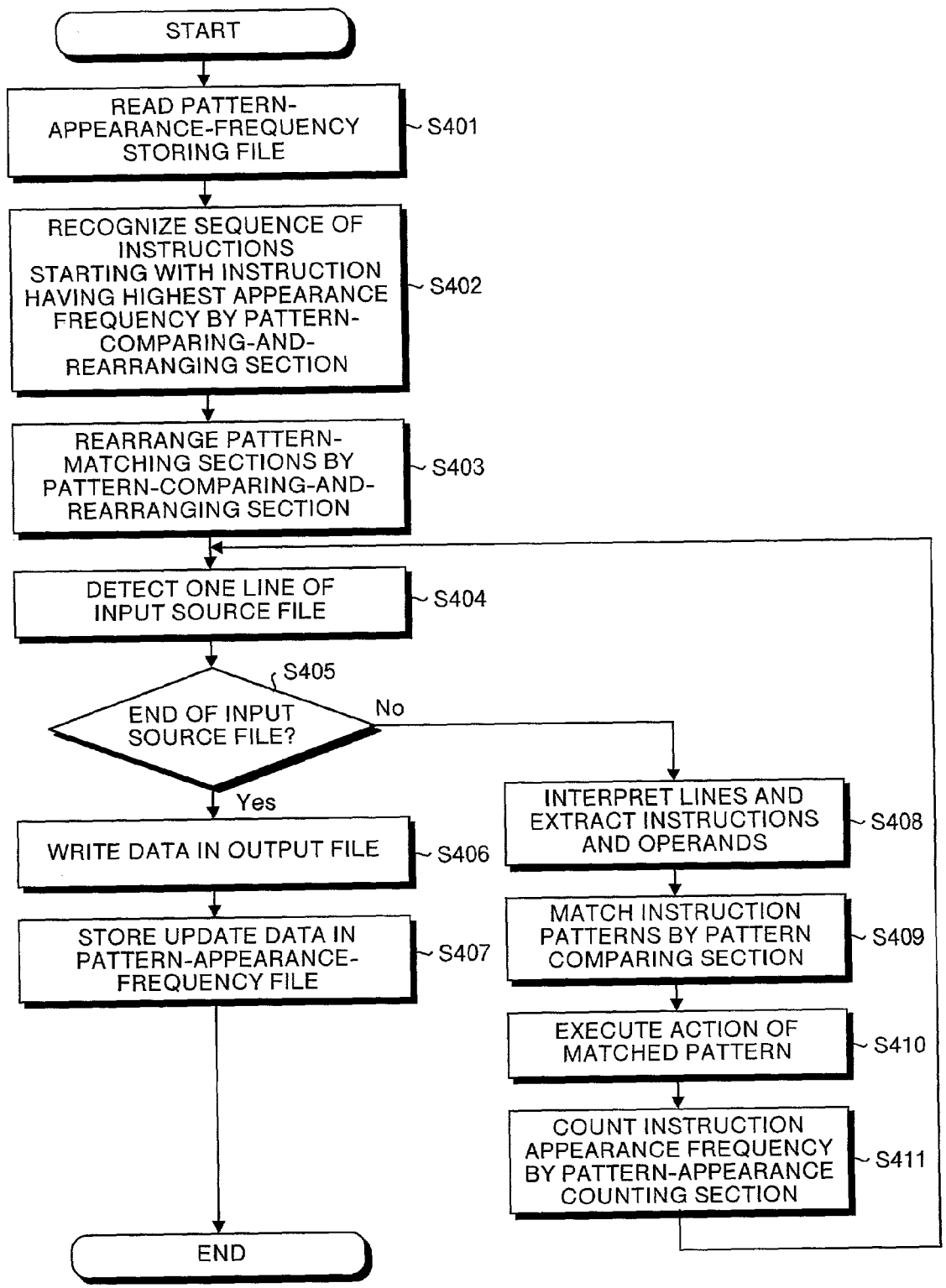
FIG. 27 is a flowchart showing the compiling operation of the control-program-development supporting apparatus of the ninth embodiment.

The compiling operation of the control-program-development supporting apparatus is described below. FIG. 27 is a flowchart showing the compiling operation of the control-program-development supporting apparatus of the ninth embodiment.

First, the control-program-development supporting apparatus inputs an input source file 50 to the program converting tool 160. In this case, it is assumed that the input source file 50 is described with the following instruction list.

LD X0

AND X10

OUT Y0

First, the control-program-development supporting apparatus reads a pattern-appearance-frequency storing file 60 to be described later (step S401) and recognizes instructions starting with an instruction having the highest appearance frequency with the pattern-comparing-and-rearranging section 172 (step S402). Thereby, the pattern-comparing-and-rearranging section 172 rearranges the first to fourth pattern comparing sections 181a to 181d in the pattern matching section 180 and the first to fourth action executing sections 182a to 182d corresponding to the sections 181a to 181d (step S403).

Then, the line detecting section 161 of the program converting tool 160 detects one line of the input source file 50 (step S404) and delivers the detected one line to a semantic interpreting section 162 when the line is not present at the end position of the input source file 50 (negative in step S405).

In the case of the above instruction list, "LD X0" is first delivered to the semantic interpreting section 162. The semantic interpreting section 162 interprets that "LD X0" is an LD instruction and makes the pattern matching section 180 retrieve the execution part of the LD instruction in order to retrieve the execution part of the ID instruction (step S408).

The pattern matching section 180 performs pattern matching in the sequence of the first pattern comparison 181a, second pattern comparison 181b, third pattern comparison 181c, and fourth pattern comparison 181d in order to find various patterns internally mounted, that is, which is the action of the instruction "LD" in the case of the above example (step S409) and, when the fourth pattern comparison 181d has a content relating to the LD instruction, executes the fourth action executing section 182d which is the operation of the LD instruction (step S410) The fourth action executing section 182d outputs an execution code description corresponding to the LD instruction to the output file 70 and the appearance frequency of the instruction is counted by the pattern appearance counting section 171 (step S411).

When the above processing is completed, the fourth action executing section 182d returns to step S404 to repeat the same processing for "AND X10" which is the next line in the above example. However, when the detected one line is present at the end position of the input source file 50 (affirmative in step S405), the section 182d completes writing in the output file 70 (step S406) and stores a result counted by the pattern appearance counting section 171 in the pattern-appearance-frequency storing file 60 as update data (step S407).

As described above, the control-program-development supporting apparatus of the ninth embodiment performs pattern matching of instructions of a control program starting with an instruction having the highest appearance frequency when compiling the control program into execution codes. Therefore, it is possible to quickly find an execution code suitable for each instruction of the control program when compiling the control program and reduce the latency for compiling the control program.

Operations of the above program converting tool 160 can be also applied to a converter for converting a control program such as an instruction list into a program file described with an advanced programming language such as C language. That is, in the above description, a content to be written in the output file 70 is not an execution code but an instruction expression of an advanced programming language.

Moreover, operations of the above program converting tool 160 can be applied to an interpreter-type programmable controller. In this case, the input source file 50 can use an instruction list or intermediate codes obtained by converting the instruction list and actions to be executed by the first to fourth action executing sections 182a to 182d result in actual programmable-logic processings.

Functions realized by the control-program-development supporting apparatuss of the first to sixth, eighth and ninth embodiments and functions realized by the programmable controllers of the first, seventh and ninth embodiments can be also mounted on the so-called software programmable controller for realizing development of a control program and also, sequential processing.

As described above, according to the present invention, a universal microprocessor that mounts an acceleration mounting unit is included and a received execution code is optimized so that it is executed by the acceleration mounting unit of the universal microprocessor. Therefore, an advantage can be obtained that sequential processing can be more quickly executed compared to the case of a conventional programmable controller for which a microprocessor is provided as an ASIC.

According to another aspect of the present invention, a control program described with a sequential-control language is compiled into an execution code executable by a universal microprocessor that mounts an acceleration mounting unit. Therefore, advantages can be obtained that it is possible to execute sequential processing by a programmable controller which mounts a universal microprocessor used for a personal computer and obtain execution codes corresponding to various universal microprocessors by changing a compiler, and thereby correspond to various programmable controllers without modifying a control program, effectively use past resources of control programs, unify the management of control programs, and make the control-program development time efficient.

According to still another aspect of the present invention, it is possible to obtain final execution codes by dividing a control program into a plurality of blocks and compiling every divided block. Therefore, advantages can be obtained that even if a long control program must be modified, it is possible to generate an execution code by recompiling only a part of the control program which must be modified without recompiling the whole of the control program like a conventional case and shorten the time required to debug or maintain a control program.

According to still another aspect of the present invention, it is possible to obtain final execution codes by dividing a control program into a plurality of blocks, converting each divided block into a universal-computer-readable advanced language, and compiling a program of the universal-computer-readable advanced language corresponding to each block. Therefore, advantages can be obtained that even if a long control program must be modified, it is possible to generate execution codes by recompiling only a part of the program which must be modified without recompiling the whole of the control program like a conventional case, still use a conventional compiler for a universal-computer-readable advanced language, and shorten the time required to debug or maintain a control program.

According to still another aspect of the present invention, an execution code is generated for a programmable controller that mounts a universal microprocessor used for a personal computer. Therefore, an advantage can be obtained that it is possible to execute sequential processing at a high speed with such high-speed processing as pipeline, super-scaler, or out-of-order compared to the case of a conventional programmable controller for which a microprocessor is provided as an ASIC.

According to still another aspect of the present invention, a control-program dividing unit divides a control program into a plurality of blocks at a gap between predetermined rungs in a ladder diagram and generates a program file every block concerned. Therefore, advantages can be obtained that it is possible to manage program files every series of circuit blocks from input up to output and reduce the frequency of a situation that optimization of registers of input/output devices under compiling is interrupted due to division. Particularly, an advantage can be obtained that it is possible to effectively use the optimization function of a compiler for outputting an out-of-order code by constituting one block of the collection of a plurality of rungs for a microprocessor that mounts acceleration mounting unit.

According to still another aspect of the present invention, a control-program diving unit divides a control program into a plurality of blocks at a gap between predetermined rungs and a position serving as a jump destination for a jump instruction and generates a program file every block concerned. Therefore, advantages can be obtained that optimization of a compiler is not influenced and it is possible to manage divided program files as subroutines and simplify debugging and maintenance of a control program.

According to still another aspect of the present invention, a control-program dividing unit generates a program file every block concerned by extracting all or some of rungs including instructions for a common input or output device in a ladder diagram, uniting all or some of the extracted rungs into one block, and dividing the rungs into a plurality of blocks. Therefore, advantages can be obtained that, when a control program must be modified for a specific device, it is possible to obtain an execution code by modifying and recompiling only a program file corresponding to the part to be modified and shorten the time required to debug or maintain the control program.

According to still another aspect of the present invention, a control program is once reconstructed into an optimum code system when compiling the program by excluding variables not cited and excluding and rearranging redundant codes. Therefore, advantages can be obtained that it is possible to provide a control program constituted of optimized codes for the compiler, reduce the time necessary for compiling the program, and improve the speed for executing the program.

According to still another aspect of the present invention, it is possible to estimate a sequential-processing execution time in accordance with a relating table relating a sample program whose processing time is already known with a control program corresponding to an execution code. Therefore, an advantage can be obtained that it is possible to accurately relate the actual processing time of an execution code generated by optimizing a compiler with each instruction in a control program corresponding to the processing time though it has been difficult to relate them so far.

According to still another aspect of the present invention, it is possible to perform step execution by relating an instruction list with the execution part of a control program described with an advanced programming language obtained by converting the instruction list and display the execution part. Therefore, advantages can be obtained that it is possible to confirm operations of a programmable controller to be operated in accordance with execution codes obtained by compiling an instruction list at the step-execution level of an instruction list described by a user and simplify the development and debugging of a control program.

According to still another aspect of the present invention, an execution code currently executed is changed to a new execution code at a predetermined timing in accordance with the difference data between the execution code currently executed and the new execution code and the changed execution code is continuously executed. Therefore, even if execution codes must be changed, advantages can be obtained that it is possible to make a programmable controller change execution codes and continue an execution state by downloading not a new execution code but difference data smaller than the execution code in size and many memory resources of the programmable controller are unnecessary.

According to still another aspect of the present invention, a control program necessary for development or debugging and execution codes are unified and stored in a programmable controller. Therefore, advantages can be obtained that it is possible to fetch the control program from execution codes and realize the consistency between the execution codes and the control program when loosing the control program or directly operating the program from the programmable controller.

According to still another aspect of the present invention, a control program necessary for development or debugging and execution codes to be actually executed are unified and newly generated as execution codes. Therefore, advantages can be obtained that it is possible to fetch the control program from the execution codes and realize the consistency between the execution codes and the control program when loosing the control program or operating the program from a programmable controller at a job site.

According to still another aspect of the present invention, when interpreting a control program into execution codes, instructions of the control program are pattern-matched starting with an instruction having the highest appearance frequency. Therefore, advantages can be obtained that it is possible to quickly find an execution code suitable for each instruction of the control program when interpreting the program and reduce the control-program execution time.

According to still another aspect of the present invention, when compiling a control program into execution codes, instructions are pattern-matched starting with an instruction having the highest appearance frequency. Therefore, advantages can be obtained that it is possible to quickly find an execution code suitable for each instruction of the control program and reduce the latency for compiling the control program.

According to still another aspect of the present invention, advantages can be obtained that it is possible to realize functions of the above control-program-development supporting apparatus and control-program-development supporting apparatus on a so-called software programmable controller making it possible to develop a control program and also perform sequential processing.

(Note 1) A programmable controller which performs sequential processing in accordance with execution codes generated by compiling a control program, comprising:

a first storing unit which stores the execution codes;

a second storing unit which stores the data for the difference between an execution code stored in the first storing unit and a new execution code;

a microprocessor to be directly executed by the execution codes;

a patch processing unit which changes an execution code currently executed to a new execution code at a predetermined timing in accordance with the difference data and continuously executing the changed execution code; and a control-program-development supporting apparatus that develops a control program described with a sequential-control language such as a ladder diagram or instruction list, which control-program-development supporting apparatus having, a control-program dividing unit which divides the control program into a plurality of blocks; and a compiler which compiles all or some of the blocks into execution codes directly executable by a programmable controller.

(Note 2) A programmable controller which performs sequential processing in accordance with execution codes generated by compiling a control program, comprising:

a first storing unit which stores the execution codes;

a second storing unit which stores the data for the difference between an execution code stored in the first storing unit and a new execution code;

a microprocessor to be directly executed by the execution codes;

a patch processing unit which changes an execution code currently executed to a new execution code at a predetermined timing in accordance with the difference data and continuously executing the changed execution code; and a control-program-development supporting apparatus that develops a control program described with a sequential-control language such as a ladder diagram or instruction list, which control-program-development supporting apparatus having, a control-program dividing unit which divides the control program into a plurality of blocks;

a control-program converting unit which converts all or some of the blocks into advanced-language control programs described with a universal-computer-readable advanced language every blocks concerned; and a compiler which compiles all or some of universal-computer-readable advanced programming languages corresponding every above block into directly executable codes by a programmable controller.

(Note 3) A programmable controller which performs sequential processing in accordance with execution codes generated by compiling a control program, comprising:

a first storing unit which stores the execution codes;

a second storing unit which stores the data for the difference between an execution code stored in the first storing unit and a new execution code;

a microprocessor to be directly executed by the execution codes;

a patch processing unit which changes an execution code currently executed to a new execution code at a predetermined timing in accordance with the difference data and continuously executing the changed execution code; and a control-program-development supporting apparatus that develops a control program described with a sequential-control language such as a ladder diagram or instruction list, which control-program-development supporting apparatus having, a control-program converting unit which converts the control program into an advanced-programming-language control program described with a universal-computer-readable advanced programming language;

a debugging-code generating unit which generates a debugging control program by inserting a line number concerned into a part corresponding to each line constituting the instruction list in source codes constituting the advanced-programming-language control program; and a debugging executing unit which displays each line of the instruction list and the execution part of the advanced-programming-language control program by relating the former with the latter.

(Note 4) A programmable controller which performs sequential processing in accordance with execution codes generated by compiling a control program, comprising:

a first storing unit which stores the execution codes;

a second storing unit which stores the data for the difference between an execution code stored in the first storing unit and a new execution code;

a microprocessor to be directly executed by the execution codes;

a patch processing unit which changes an execution code currently executed to a new execution code at a predetermined timing in accordance with the difference data and continuously executing the changed execution code; and a control-program-development supporting apparatus that develops a control program described with a sequential-control language such as a ladder diagram or instruction list, which control-program-development supporting apparatus having, an instruction counting unit which counts the appearance frequency of each instruction used for the control program;

a pattern-matching-table generating unit which generates a pattern-matching table in which instructions are listed starting with the highest appearance frequency in accordance with results counted by the instruction-counting unit; and a compiler which compiles the control program into directly executable codes by the programmable controller while pattern-matching the instructions listed in the pattern matching table in order.

(Note 5) A programmable controller which performs sequential processing in accordance with execution codes generated by compiling a control program, said programmable controller comprising:

a storing unit which stores the execution codes;

a microprocessor to be directly executed by the execution codes, wherein the execution codes include binary data generated by compressing the control program; and a control-program-development supporting apparatus that develops a control program described with a sequential-control language such as a ladder diagram or instruction list, which control-program-development supporting apparatus having, a control-program dividing unit which divides the control program into a plurality of blocks; and a compiler which compiles all or some of the blocks into execution codes directly executable by a programmable controller.

(Note 6) A programmable controller which performs sequential processing in accordance with execution codes generated by compiling a control program, said programmable controller comprising:

a storing unit which stores the execution codes;

a microprocessor to be directly executed by the execution codes, wherein the execution codes include binary data generated by compressing the control program; and a control-program-development supporting apparatus that develops a control program described with a sequential-control language such as a ladder diagram or instruction list, which control-program-development supporting apparatus having, a control-program dividing unit which divides the control program into a plurality of blocks;

a control-program converting unit which converts all or some of the blocks into advanced-language control programs described with a universal-computer-readable advanced language every blocks concerned; and a compiler which compiles all or some of universal-computer-readable advanced programming languages corresponding every above block into directly executable codes by a programmable controller.

(Note 7) A programmable controller which performs sequential processing in accordance with execution codes generated by compiling a control program, said programmable controller comprising:

a storing unit which stores the execution codes;

a microprocessor to be directly executed by the execution codes, wherein the execution codes include binary data generated by compressing the control program; and a control-program-development supporting apparatus that develops a control program described with a sequential-control language such as a ladder diagram or instruction list, which control-program-development supporting apparatus having, a control-program converting unit which converts the control program into an advanced-programming-language control program described with a universal-computer-readable advanced programming language;

a debugging-code generating unit which generates a debugging control program by inserting a line number concerned into a part corresponding to each line constituting the instruction list in source codes constituting the advanced-programming-language control program; and a debugging executing unit which displays each line of the instruction list and the execution part of the advanced-programming-language control program by relating the former with the latter.

(Note 8) A programmable controller which performs sequential processing in accordance with execution codes generated by compiling a control program, said programmable controller comprising:

a storing unit which stores the execution codes;

a microprocessor to be directly executed by the execution codes, wherein the execution codes include binary data generated by compressing the control program; and a control-program-development supporting apparatus that develops a control program described with a sequential-control language such as a ladder diagram or instruction list, which control-program-development supporting apparatus having, an instruction counting unit which counts the appearance frequency of each instruction used for the control program;

a pattern-matching-table generating unit which generates a pattern-matching table in which instructions are listed starting with the highest appearance frequency in accordance with results counted by the instruction-counting unit; and a compiler which compiles the control program into directly executable codes by the programmable controller while pattern-matching the instructions listed in the pattern matching table in order.

(Note 9) A programmable controller which performs sequential processing in accordance with a control program described with a sequential-control language such as a ladder diagram or instruction list, said programmable controller comprising:

a storing unit which stores the control program;

an instruction counting unit which counts the appearance frequency of each instruction used for the control program;

a pattern-matching-table generating unit which generates a pattern-matching table in which instructions are listed starting with the highest appearance frequency in accordance with results counted by the instruction-counting unit;

an interpreting unit which executes the control program while pattern-matching the instructions listed in the pattern-matching table in order and interpreting the control program into directly-executable execution codes by the programmable controller; and a control-program-development supporting apparatus that develops a control program described with a sequential-control language such as a ladder diagram or instruction list, which control-program-development supporting apparatus having, a control-program dividing unit which divides the control program into a plurality of blocks; and a compiler which compiles all or some of the blocks into execution codes directly executable by a programmable controller.

(Note 10) A programmable controller which performs sequential processing in accordance with a control program described with a sequential-control language such as a ladder diagram or instruction list, said programmable controller comprising:

a storing unit which stores the control program;

an instruction counting unit which counts the appearance frequency of each instruction used for the control program;

a pattern-matching-table generating unit which generates a pattern-matching table in which instructions are listed starting with the highest appearance frequency in accordance with results counted by the instruction-counting unit;

an interpreting unit which executes the control program while pattern-matching the instructions listed in the pattern-matching table in order and interpreting the control program into directly-executable execution codes by the programmable controller; and a control-program-development supporting apparatus that develops a control program described with a sequential-control language such as a ladder diagram or instruction list, which control-program-development supporting apparatus having, a control-program dividing unit which divides the control program into a plurality of blocks;

a control-program converting unit which converts all or some of the blocks into advanced-language control programs described with a universal-computer-readable advanced language every blocks concerned; and a compiler which compiles all or some of universal-computer-readable advanced programming languages corresponding every above block into directly executable codes by a programmable controller.

(Note 11) A programmable controller which performs sequential processing in accordance with a control program described with a sequential-control language such as a ladder diagram or instruction list, said programmable controller comprising:

a storing unit which stores the control program;

an instruction counting unit which counts the appearance frequency of each instruction used for the control program;

a pattern-matching-table generating unit which generates a pattern-matching table in which instructions are listed starting with the highest appearance frequency in accordance with results counted by the instruction-counting unit;

an interpreting unit which executes the control program while pattern-matching the instructions listed in the pattern-matching table in order and interpreting the control program into directly-executable execution codes by the programmable controller; and a control-program-development supporting apparatus that develops a control program described with a sequential-control language such as a ladder diagram or instruction list, which control-program-development supporting apparatus having, a control-program converting unit which converts the control program into an advanced-programming-language control program described with a universal-computer-readable advanced programming language;

a debugging-code generating unit which generates a debugging control program by inserting a line number concerned into apart corresponding to each line constituting the instruction list in source codes constituting the advanced-programming-language control program; and a debugging executing unit which displays each line of the instruction list and the execution part of the advanced-programming-language control program by relating the former with the latter.

(Note 12) A programmable controller which performs sequential processing in accordance with a control program described with a sequential-control language such as a ladder diagram or instruction list, said programmable controller comprising:

a storing unit which stores the control program;

an instruction counting unit which counts the appearance frequency of each instruction used for the control program;

a pattern-matching-table generating unit which generates a pattern-matching table in which instructions are listed starting with the highest appearance frequency in accordance with results counted by the instruction-counting unit;

an interpreting unit which executes the control program while pattern-matching the instructions listed in the pattern-matching table in order and interpreting the control program into directly-executable execution codes by the programmable controller; and a control-program-development supporting apparatus that develops a control program described with a sequential-control language such as a ladder diagram or instruction list, which control-program-development supporting apparatus having, an instruction counting unit which counts the appearance frequency of each instruction used for the control program;

a pattern-matching-table generating unit which generates a pattern-matching table in which instructions are listed starting with the highest appearance frequency in accordance with results counted by the instruction-counting unit; and a compiler which compiles the control program into directly executable codes by the programmable controller while pattern-matching the instructions listed in the pattern matching table in order.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control-program-development supporting apparatus that develops a control program described with a sequential-control language, said control-program-development supporting apparatus comprising:

a compiler which compiles the control program into codes directly executable by a microprocessor that includes at least one cache; and an optimization filtering unit which reconstructs the control program into an optimum code system by excluding not-cited variables and redundant codes, recombining logical operations, and rearranging codes for locally arranging instructions for a common input or output device before the control program is compiled by the compiler, wherein a control program optimized by said optimization filtering unit is newly used as the control program.

2. A control-program-development supporting apparatus that develops a control program described with a sequential-control language, said control-program-development supporting apparatus comprising:

a control-program dividing unit which divides the control program into blocks, each block including at least one rung;

a compiler which compiles at least some of the blocks into execution codes directly executable by a programmable controller, wherein the programmable controller includes a microprocessor having pipeline logic; and an optimization filtering unit which reconstructs the control program into an optimum code system by excluding not-cited variables and redundant codes, recombining logical operations, and rearranging codes for locally arranging instructions for a common input or output device before the control program is compiled by the compiler, wherein a control program optimized by said optimization filtering unit is newly used as the control program, and the microprocessor includes pipeline logic and a cache.

3. The control-program-development supporting apparatus according to claim 2, wherein the control program is a ladder diagram or an instruction list generated from the ladder diagram, and the control-program dividing unit divides the control program into blocks, each block including at least one rung at a predetermined rung in the ladder diagram to generate a program file for every block concerned.

4. The control-program-development supporting apparatus according to claim 2, wherein the control program is a ladder diagram or an instruction list generated from the ladder diagram, and the control-program dividing unit divides the control program into blocks, each block including at least one rung at a predetermined rung serving as a jump destination for a jump instruction in the ladder diagram to generate a program file for every block.

5. The control-program-development supporting apparatus according to claim 2, wherein
the control program is a ladder diagram or an instruction list generated from the ladder diagram, and
the control-program dividing unit extracts at least some rungs including instructions to a common input or output device from the ladder diagram, at least some of the rungs extracted constituting one controllable block, and generates a program file for every block.

6. The control-program-development supporting apparatus according to claim 2, further comprising a processing-time rough-estimating unit which has a relating table which relates sample program having known processing times with the control program corresponding to the execution codes to estimate a sequential-processing execution time of a programmable controller in accordance with the relating table, wherein the processing-time rough-estimating unit determines and selects the sample program most similar to the control program to estimate processing time.

7. A control-program-development supporting apparatus that develops a control program described with a sequential-control language, said control-program-development supporting apparatus comprising:
a control-program dividing unit which divides the control program into blocks, each block including at least one rung;
a control-program converting unit which converts at least some of the blocks into high-level-language control programs described with a computer-readable high-level language for every block;
a compiler which compiles at least some of computer-readable high-level programming languages corresponding to every block into codes directly executable by a programmable controller; and
an optimization filtering unit which reconstructs the control program into an optimum code system by excluding not-cited variables and redundant codes, recombining logical operations, and rearranging codes for locally arranging instructions for a common input or output device before the control program is compiled by the compiler, wherein a control program optimized by said optimization filtering unit is newly used as the control program.

8. The control-program-development supporting apparatus according to claim 7, wherein
the control program is a ladder diagram or an instruction list generated from the ladder diagram, and
the control-program dividing unit divides the control program into blocks, each block including at least one rung at a predetermined rung in the ladder diagram to generate a program file for every block.

9. The control-program-development supporting apparatus according to claim 7, wherein the control program is a ladder diagram or an instruction list generated from the ladder diagram, and the control-program dividing unit divides the control program into blocks, each block including at least one rung at a predetermined rung, serving as a jump destination for a jump instruction in the ladder diagram, to generate a program file for every block.

10. The control-program-development supporting apparatus according to claim 7, wherein
the control program is a ladder diagram or an instruction list generated from the ladder diagram, and
the control-program dividing unit extracts at least some of rungs including instructions to a common input or output device from the ladder diagram, constituting one controllable block of at least some of the extracted rungs, and generates a program file for every block.

11. The control-program-development supporting apparatus according to claim 7, further comprising a processing-time rough-estimating unit which has a relating table which relates sample programs having processing times already known with the control program corresponding to the execution codes to estimate a sequential-processing execution time of a programmable controller in accordance with the relating table, wherein the processing-time rough-estimating unit determines and selects the sample program most similar to the control program to estimate processing time.

12. A programmable controller that performs sequential processing in accordance with execution codes generated by compiling a control program, said programmable controller comprising:
a storing unit which stores the execution codes;
a microprocessor including pipeline logic and directly executing the execution codes; and
a control-program-development supporting apparatus that develops a control program described with a sequential-control language, the control-program-development supporting apparatus having
a control-program dividing unit which divides the control program into blocks, each block including at least one rung;
a compiler which compiles at least some of the blocks into execution codes directly executable by a programmable controller; and
an optimization filtering unit which reconstructs the control program into an optimum code system by excluding not-cited variables and redundant codes, recombining logical operations, and rearranging codes for locally arranging instructions for a common input or output device before the control program is compiled by the compiler, wherein a control program optimized by said optimization filtering unit is newly used as the control program.

13. A programmable controller that performs sequential processing in accordance with execution codes generated by compiling a control program, said programmable controller comprising:
a storing unit which stores the execution codes;
a microprocessor including pipeline logic and directly executing the execution codes; and
a control-program-development supporting apparatus that develops a control program, described with a sequential-control language, the control-program-development supporting apparatus having
a control-program dividing unit which divides the control-program into blocks, each block including at least one rung;
a control-program converting unit which converts at least some of the blocks into high-level-language control programs described with a computer-readable high-level language for every block;

a compiler which compiles at least some of computer-readable high-level programming languages corresponding to every block into codes directly executable by a programmable controller; and, an optimization filtering unit which reconstructs the control program into an optimum code system by excluding not-cited variables and redundant codes, recombining logical operations, and rearranging codes for locally arranging instructions for a common input or output device before the control program is compiled by the compiler, wherein a control program optimized by said optimization filtering unit is newly used as the control program.

* * * * *